United States Patent
Sakakibara et al.

(10) Patent No.: US 9,724,981 B2
(45) Date of Patent: Aug. 8, 2017

(54) AIR CONDITIONING REGISTER

(75) Inventors: Kimio Sakakibara, Nishio (JP); Michiyo Nonoyama, Okazaki (JP); Keiko Tanaka, Toyota (JP); Makoto Inoue, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 1116 days.

(21) Appl. No.: 12/376,461

(22) PCT Filed: Jul. 10, 2007

(86) PCT No.: PCT/JP2007/064048
§ 371 (c)(1),
(2), (4) Date: Feb. 5, 2009

(87) PCT Pub. No.: WO2008/018268
PCT Pub. Date: Feb. 14, 2008

(65) Prior Publication Data
US 2010/0263401 A1    Oct. 21, 2010

(30) Foreign Application Priority Data
Aug. 9, 2006  (JP) ................................ 2006-217435

(51) Int. Cl.
B60H 1/34    (2006.01)
(52) U.S. Cl.
CPC ... B60H 1/3421 (2013.01); *B60H 2001/3464* (2013.01); *B60H 2001/3478* (2013.01)
(58) Field of Classification Search
CPC ........................................................ B60H 1/34
(Continued)

(56) References Cited

U.S. PATENT DOCUMENTS

| 2003/0157880 A1* | 8/2003 | Nishida et al. ............... 454/155 |
| 2005/0118944 A1* | 6/2005 | Vincent et al. ............... 454/121 |

(Continued)

FOREIGN PATENT DOCUMENTS

| DE | 30 01 163 A1 | 7/1981 |
| DE | 197 39 652 A1 | 3/1999 |

(Continued)

OTHER PUBLICATIONS

Notice of Reasons for Rejection for JP Appl. No. 2006-217435 dated Jun. 15, 2010.

(Continued)

*Primary Examiner* — Steven B McAllister
*Assistant Examiner* — Samantha Miller
(74) *Attorney, Agent, or Firm* — Finnegan, Henderson, Farabow, Garrett & Dunner, LLP

(57) ABSTRACT

There is provided an air conditioning register which can prevent or effectively suppress a reduction in an effective opening surface area at an air-conditioned air blow-out portion, and which has good blow-out efficiency of air-conditioned air. A first flow path 42 and a second flow path 44, whose directions toward a blow-out bezel 26 differ, are formed within a retainer 12 of an air conditioning register 10. A first damper 52 and plural second dampers 58, which are interlocked with one another, are provided at the retainer 12. The first damper 52 opens and closes the first flow path 42, and the second dampers 58 open and close the second flow path 44. The first damper 52 and the second dampers 58 are operated such that either one of the first flow path 42 and the second flow path 44 is opened and the other is closed, and the flow path of the air-conditioned air is switched. In this way, a blow-out direction of the air-conditioned air from the blow-out bezel 26 is controlled, while a reduction in an effective opening surface area at the blow-out bezel 26 is prevented or effectively suppressed.

3 Claims, 17 Drawing Sheets

(58) Field of Classification Search
USPC .................................................. 454/107, 155
See application file for complete search history.

(56) References Cited

U.S. PATENT DOCUMENTS

2005/0239391 A1* 10/2005 Shibata .................. 454/155
2006/0223430 A1* 10/2006 Shibata et al. ............. 454/155

FOREIGN PATENT DOCUMENTS

| DE | 20 2004 008 181 U1 | 7/2004 |
|----|----|----|
| DE | 20 2006 004 052 U1 | 6/2006 |
| FR | 2 788 019 | 7/2000 |
| JP | 61-211123 | 9/1986 |
| JP | U 62-160255 | 10/1987 |
| JP | U 2-82614 | 6/1990 |
| JP | 4-39121 | 2/1992 |
| JP | U 5-83651 | 11/1993 |
| JP | 2005-306224 | 11/2005 |
| WO | WO 99/07569 | 2/1999 |

OTHER PUBLICATIONS

Notice of Reasons for Rejection for Japanese Patent Appl. No. 2006-217435 dated Dec. 21, 2010.
Notification of the Third Office Action for Chinese Patent Appl. No. 200780029484.0 dated Jan. 12, 2011.
Notice of Reasons for Rejection for JP Appl. No. 2006-217435 dated Aug. 9, 2011.

* cited by examiner

F I G. 11
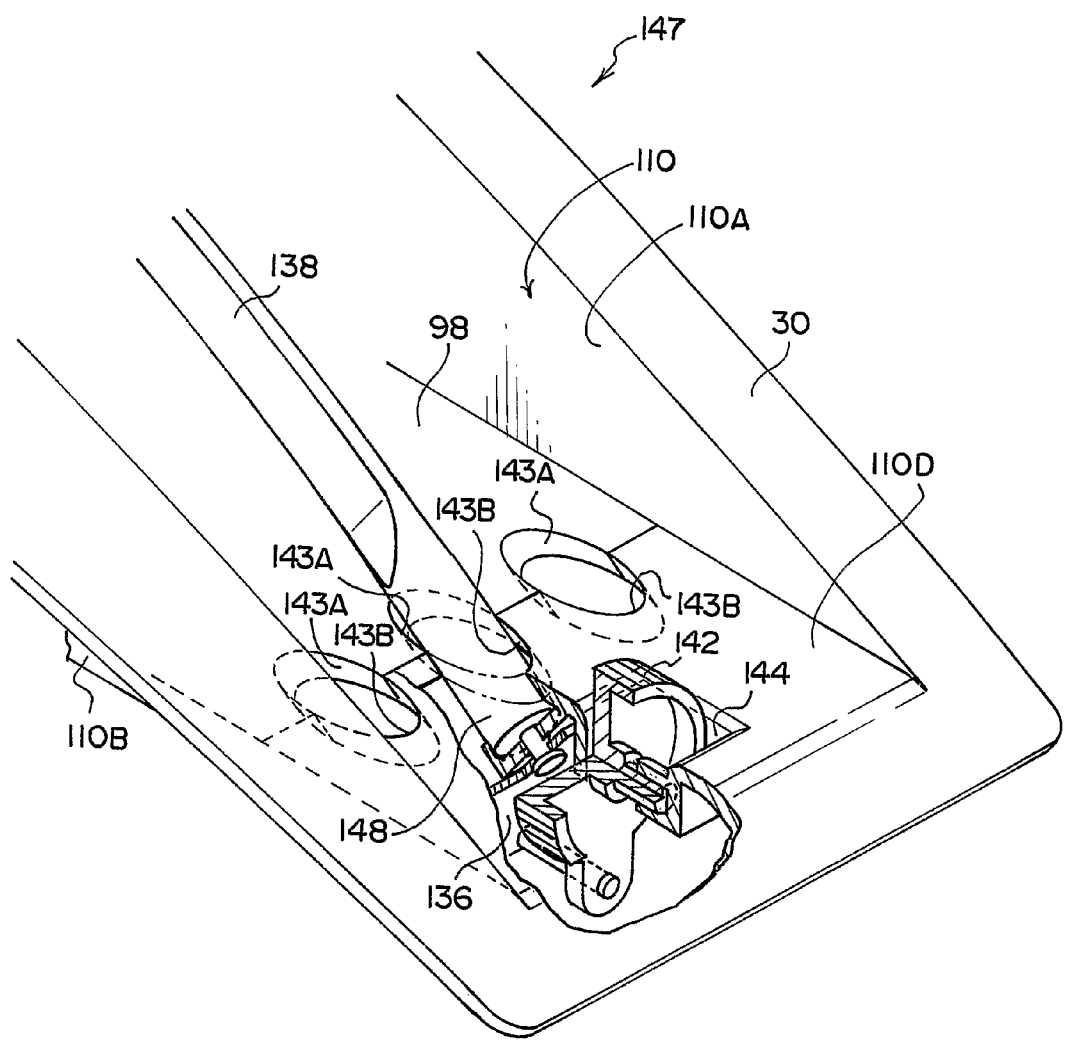

F I G. 12
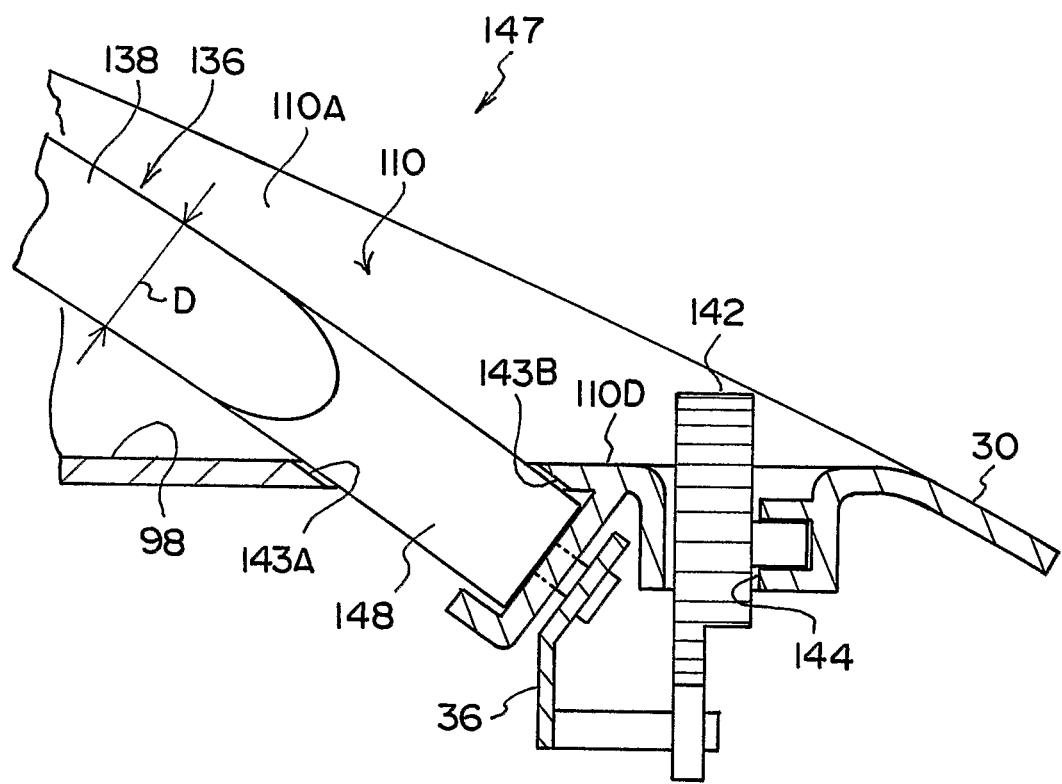

AIR CONDITIONING REGISTER

CROSS-REFERENCE TO RELATED APPLICATIONS

This application is a national phase application of International Application No. PCT/JP2007/064048, filed Jul. 10, 2007, and claims the priority of Japanese Application No. 2006-217435, filed Aug. 9, 2006, the contents of both of which are incorporated herein by reference.

FIELD OF THE INVENTION

The present invention relates to an air conditioning register which structures an air conditioner of a vehicle.

DESCRIPTION OF THE RELATED ART

As disclosed in Japanese Patent Application Laid-Open (JP-A) No. 2005-306224, an air conditioning register, which blows-out, into a vehicle cabin, air-conditioned air which has been generated at the main body of an air conditioner, has a retainer. The retainer structures the main body of the air conditioning register. The air-conditioned air, which has passed through the inner side of the air conditioning register, is blown-out to the interior of the vehicle cabin from a blow-out port which is provided at the retainer.

Plural horizontal fins and plural vertical fins are provided at the blow-out port of the air conditioning register. The horizontal fins are narrow plate-shaped members whose longitudinal direction runs along the substantially transverse direction of the vehicle. The longitudinal direction both end portions of the horizontal fins are rotatably supported at the inner side of the blow-out port. The air-conditioned air is blown-out along the short-side direction of the horizontal fins. By rotating the horizontal fins, the orientation thereof changes, and the air-direction of the air-conditioned air in the substantially vertical direction of the vehicle thereby changes.

On the other hand, the vertical fins are provided more deeply within the blow-out port than the horizontal fins. The vertical fins are narrow plate-shaped members whose longitudinal direction runs along the substantially vertical direction of the vehicle. The longitudinal direction both end portions of the vertical fins are rotatably supported at the inner side of the blow-out port. The air-conditioned air is blown-out along the short-side direction of the vertical fins. By rotating the vertical fins, the orientation thereof changes, and the air-direction of the air-conditioned air in the substantially transverse direction of the vehicle is thereby adjusted.

As described above, generally, the air-direction of the air-conditioned air is adjusted by appropriately rotating the horizontal fins and the vertical fins.

For example, if the horizontal fins are rotated in order to direct the air-direction furthest downward, the air-direction of the air-conditioned air basically cannot be adjusted at the region beneath the front end portion in the short-side direction (the end portion facing toward the deeper side of the retainer) of the lowermost horizontal fin among the plural horizontal fins. Therefore, in the range of the opening of the blow-out port, the range over which the air-conditioned air is blown-out becomes only the region above the front end portion in the short-side direction of the horizontal fin. The "effective opening surface area", which is the surface area of the range over which the air-conditioned air is blown-out with respect to the opening surface area of the blow-out port, becomes small, and the blow-out efficiency of the air-conditioned air is reduced.

Further, because these respective vertical and horizontal fins have thicknesses, by providing these fins at the blow-out port, the effective opening surface area becomes smaller by an amount equal to the sum of the thicknesses of the respective fins. Therefore, in cases in which the blow-out port is made to be small or the blow-out port is made to be narrow, the proportion of the opening surface area of the blow-out port which is occupied by the fins becomes large, and it may be difficult to improve the blow-out efficiency of the air-conditioned air.

SUMMARY OF THE INVENTION

In view of the aforementioned, a subject of the present invention is to provide an air conditioning register which can prevent or effectively suppress a reduction in the effective opening surface area at a portion which blows-out air-conditioned air, and which has good efficiency of blowing-out air-conditioned air.

An air conditioning register of a first aspect of the present invention has: a register main body having an air blow-out port which opens toward a vehicle cabin interior, the register main body passing air-conditioned air which has been sent from an air conditioner main body, and blowing the air-conditioned air out from the air blow-out port toward the vehicle cabin interior; and an air-direction controlling unit for adjusting a direction of a flow of the air-conditioned air which passes through an interior of the register main body, and controlling a blow-out direction of the air-conditioned air from the air blow-out port.

In accordance with the above-described aspect, the direction of the flow of the air-conditioned air, which flows within the register main body, is adjusted in the register main body by the air-direction controlling unit. The air-direction of the air-conditioned air which is blown-out from the air blow-out port is thereby controlled. In this way, at the present air conditioning register, because the direction of the flow of the air-conditioned air is adjusted at the time when the air-conditioned air passes through the interior of the register main body, the air-direction of the air-conditioned air can be controlled to a desired direction even if the air-direction is not controlled at the air blow-out port. In this way, as compared with a structure in which fins or the like are provided at the air blow-out port, a reduction in the effective opening surface area can be prevented or effectively suppressed.

The above-described aspect may be structured such that a plurality of air-conditioned air flow paths are formed at the register main body, and each of the air-conditioned air flow paths communicates with the air blow-out port and is formed such that the air-conditioned air can pass through an interior of the air-conditioned air flow path, and the direction of the flow of the air-conditioned air which is heading toward the air blow-out port is different at each of the air-conditioned air flow paths, and the air-direction controlling unit includes an opening/closing part that, in a state in which the opening/closing part opens any of the plurality of air-conditioned air flow paths, closing the air-conditioned air flow paths other than the air-conditioned air flow path which is opened.

In accordance with the above-described aspect, plural air-conditioned air flow paths are formed at the register main body. When any of the air-conditioned air flow paths is opened by the opening/closing part, the other air-conditioned air flow paths are closed, and the air-conditioned air passes through the opened air-conditioned air flow path and heads toward the air blow-out port. At these air-conditioned air flow paths, the directions of the flows of the air-conditioned air, which passes through the interiors of the air-conditioned air flow paths and heads toward the air blow-out port, are different. Therefore, by operating the opening/closing part and selecting an air-conditioned air flow path, the direction of the flow of the air-conditioned air can be adjusted, and accordingly, the air-direction of the air-conditioned air which is blown-out from the air blow-out port can be controlled. A reduction in the effective opening surface area can thereby be prevented or effectively suppressed, as compared with a structure in which fins or the like are provided at the air blow-out port.

In the above-described aspect, the air-direction controlling unit may include: a passage position changing part for changing a passage position of the air-conditioned air at the air blow-out port; and a deflecting part for changing the direction of the flow of the air-conditioned air within the register main body interlockingly with the passage position changing part, and directing the air-conditioned air toward the passage position changed by the passage position changing part.

In accordance with the above-described aspect, when the passage position changing part operates, the passage position of the air-conditioned air at the air blow-out port is changed. Further, when the deflecting part operates interlockingly with the passage position changing part, the direction of the flow of the air-conditioned air at the interior of the register main body is changed, and the air-conditioned air flowing within the register main body thereby heads toward the passage position changed by the passage position changing part. In this way, due to the passage position of the air-conditioned air at the air blow-out port changing in accordance with the direction of the flow of the air-conditioned air, a reduction in the effective opening surface area of the air blow-out port can be prevented or effectively suppressed even if the direction of the flow of the air-conditioned air changes.

In the above-described aspect, the air-direction controlling unit may include a flow path shape changing part for structuring a flow path of the air-conditioned air at the interior of the register main body, and, due to the flow path shape changing part operating, a shape of the flow path changes and the flow path shape changing part changes the direction of the flow of the air-conditioned air within the flow path.

In accordance with the above-described aspect, the flow path shape changing part, which is provided at the interior of the register main body, structures the flow path of the air-conditioned air. The direction of the flow of the air-conditioned air within the register main body is determined by the flow path changing part. Further, when the flow path shape changing part operates, the shape of the flow path of the air-conditioned air changes, and the direction of the flow of the air-conditioned air thereby changes in accordance with the changed shape of the flow path. In this way, because the direction of the flow of the air-conditioned air within the register main body can be changed, the air-direction of the air-conditioned air can be controlled while a reduction in the effective opening surface area of the air blow-out port is prevented or effectively suppressed.

The above-described aspect may be structured such that the flow path shape changing part includes a first air-conditioned air guiding member and a second air-conditioned air guiding member, a proximal end side of the first air-conditioned air guiding member is provided at one inner wall of mutually opposing inner walls among inner walls of the register main body, and, due to the first air-conditioned air guiding member rotating around the proximal end side thereof, a distal end side of the first air-conditioned air guiding member approaches and moves away from the one inner wall and an angle of inclination of the first air-conditioned air guiding member with respect to a wall surface of the one inner wall changes, and a proximal end side of the second air-conditioned air guiding member is provided at another inner wall of the mutually opposing inner walls among the inner walls of the register main body, and the second air-conditioned air guiding member rotates around the proximal end side thereof interlockingly with rotation of the first air-conditioned air guiding member, and, due to the rotation of the second air-conditioned air guiding member, a distal end side of the second air-conditioned air guiding member approaches and moves away from the other inner wall and an angle of inclination of the second air-conditioned air guiding member with respect to a wall surface of the other inner wall changes in accordance with the angle of inclination of the first air-conditioned air guiding member.

In accordance with the above-described aspect, when the first air-conditioned air guiding member rotates around the proximal end side thereof, the distal end side thereof approaches and moves away from one inner wall of mutually opposing inner walls among the inner walls of the register main body. The angle of inclination of the first air-conditioned air guiding member with respect to the wall surface of the one inner wall thereby changes. Further, when the first air-conditioned air guiding member rotates in this way, interlockingly therewith, the second air-conditioned air guiding member rotates around the proximal end side thereof. In this way, the distal end side of the second air-conditioned air guiding member approaches and moves away from the other inner wall of the mutually opposing inner walls among the inner walls of the register main body. The angle of inclination of the second air-conditioned air guiding member with respect to the wall surface of this other inner wall thereby changes in accordance with the angle of inclination of the first air-conditioned air guiding member.

In this way, due to the angles of inclination of the first air-conditioned air guiding member and the second air-conditioned air guiding member changing, the shape of the flow path of the air-conditioned air changes, and, in accordance therewith, the direction of the flow of the air-conditioned air at the interior of the register main body changes.

The above-described aspect may be structured such that the register main body further includes a register design portion and a fin, an opening is formed in the register design portion in correspondence with the air blow-out port, and a surface of the register design portion, together with a surface of a design member of the vehicle which is provided at a periphery of the surface of the register design portion, structures a design surface, and at least one longitudinal direction end side of the fin is supported further toward an inner side of the air blow-out port than the surface of the register design portion, so as to be rotatable around an axis whose axial direction is a longitudinal direction of the fin, and, due to the fin rotating, an orientation of a short-side direction thereof is changed and the fin changes a direction of the air-conditioned air in a direction which intersects a changing direction of the air-conditioned air by the air-direction controlling unit.

In accordance with the above-described aspect, when the fin is rotated, the direction of the air-conditioned air is changed in a direction which intersects the changing direction of the air-conditioned air by the air-direction controlling unit (e.g., if the changing direction of the air-conditioned air by the air-direction controlling unit is the substantially vertical direction of the vehicle, the direction of the air-conditioned air is changed in the substantially transverse direction of the vehicle, or the like). Here, at least one longitudinal direction end side of the fin is provided further toward the inner side of the air blow-out port than the surface of the register design portion. Therefore, the external appearance of the air blow-out port can be improved.

The above-described aspect may further include: a fin supported so as to be rotatable around an axis whose axial direction is a longitudinal direction of the fin, and, due to the fin rotating, an orientation of a short-side direction thereof is changed and the fin changes a direction of the air-conditioned air in a direction which intersects a changing direction of the air-conditioned air by the air-direction controlling unit; and a reinforcing member provided at an inner side of the fin and reinforcing the fin.

In accordance with the above-described aspect, when the fin is rotated, the direction of the air-conditioned air is changed in a direction which intersects the changing direction of the air-conditioned air by the air-direction controlling unit (e.g., if the changing direction of the air-conditioned air by the air-direction controlling unit is the substantially vertical direction of the vehicle, the direction of the air-conditioned air is changed in the substantially transverse direction of the vehicle, or the like). Here, the reinforcing member is provided at the inner side of the fin, and the rigidity of the fin can be improved by this reinforcing member. Therefore, for example, even if the dimension of the air blow-out port along the longitudinal direction of the fin is made to be large, and accompanying this, the fin is made to be long, the rigidity of the fin can be ensured.

Further, by enabling an improvement in the rigidity of the fin by providing the reinforcing member, the fin can be made to be thinner. In this way, a reduction in the effective opening surface area of the air blow-out port due to the provision of the fin can be suppressed.

The above-described aspect may be structured such that the register main body further includes a register design portion and a projecting portion, an opening is formed in the register design portion in correspondence with the air blow-out port, and a surface of the register design portion, together with a surface of a design member of the vehicle which is provided at a periphery of the surface of the register design portion, structures a design surface, and the projecting portion is provided at the register design portion in a vicinity of the opening.

In accordance with the above-described aspect, the register design portion is provided at the register main body. Together with the surface of a design member which is provided in the vehicle cabin, the surface of the register design portion structures the design surface. The projecting portion is formed in a vicinity of the opening which is formed in the register design portion in correspondence with the air blow-out port. When the air-conditioned air, which is blown-out from the air blow-out port, attempts to flow along the surface of the register design portion, the projecting portion interferes with the air-conditioned air, and the air-conditioned air is spaced apart from the surface of the register design portion. In this way, so-called sticking of the air-conditioned air to the surface of the register design portion can be prevented or effectively suppressed, and the air-conditioned air can be effectively directed toward the vehicle cabin interior.

The above-described aspect may further include: a fin supported so as to be rotatable around an axis whose axial direction is a longitudinal direction of the fin, and, due to the fin rotating, an orientation of a short-side direction thereof is changed and the fin changes a direction of the air-conditioned air in a direction which intersects a changing direction of the air-conditioned air by the air-direction controlling unit; and a fin operation portion provided so as to project-out further than the surface of the register design portion, and, due to the fin operation portion being operated, the fin operation portion causes the fin to rotate, wherein the fin operation portion is made to be the projecting portion.

In accordance with the above-described aspect, when the fin operation portion, which projects-out further than the surface of the register design portion, is operated and the fin is rotated, the direction of the air-conditioned air is changed in a direction which intersects the changing direction of the air-conditioned air by the air-direction controlling unit (e.g., if the changing direction of the air-conditioned air by the air-direction controlling unit is the substantially vertical direction of the vehicle, the direction of the air-conditioned air is changed in the substantially transverse direction of the vehicle, or the like).

The fin operation portion, which projects-out further than the surface of the register design portion, is the aforementioned projecting portion. When the air-conditioned air attempts to flow along the surface of the register design portion, the fin operation portion interferes with the air-conditioned air and spaces the air-conditioned air apart from the surface of the register design portion. Sticking of the air-conditioned air to the surface of the register design portion is prevented or effectively suppressed. By making the fin operation portion be the projecting portion in this way, it suffices to not especially provide a projecting portion at the register design portion. The parts cost can be reduced, and a deterioration in the external appearance due to the special provision of a projecting portion at the register design portion can be prevented or suppressed.

The above-described aspect may further include: a fin which, by rotating around an axis whose axial direction is a longitudinal direction of the fin, an orientation of a short-side direction of the fin is changed and the fin adjusts the air-direction of the air-conditioned air; and a shaft portion provided coaxially with a center of rotation of the fin at one longitudinal direction end portion of the fin, and disposed within a hole portion formed in the register main body.

In accordance with the above-described aspect, when the fin is rotated around an axis whose axial direction is the longitudinal direction of the fin, the fin changes the transverse direction orientation around this rotational center, and the air-conditioned air flows in the direction corresponding to the transverse direction of the fin. The direction of the air-conditioned air is thereby changed.

The shaft portion which is provided at the one axial direction end of the fin is coaxial to the rotational center of the fin, and is disposed in the hole portion which is formed in the register main body. Therefore, either no gap arises between the end portion of the fin and the surface of the register main body, or such a gap is small. In this way, either the effects of the gap on the air-conditioned air can be eliminated or can be made to be small. Therefore, the direction of the air-conditioned air can be changed smoothly and reliably.

In the above-described aspect, a radius from a rotation axis center to an outer peripheral portion of the shaft portion may be set to be greater than or equal to a distance from the center of rotation of the fin to an end portion which is furthest from the center of rotation among both transverse direction ends of the fin.

In accordance with the above-described aspect, the radius from the axial center to the outer peripheral portion of the shaft portion is greater than or equal to the distance from the rotational center of the fin to, among the transverse direction both end portions of the fin, the end portion which is furthest away from the rotational center. Therefore, even if, by rotating the fin, the end portion of the fin at the shaft portion side becomes spaced apart from the surface of the register main body in a vicinity of the hole portion, as the end portion of the fin becomes spaced apart, the shaft portion which is integral with the fin is exposed at the outer side of the hole portion, and therefore, no gap arises between the end portion of the fin and the surface of the register main body. In this way, because no gap arises between the end portion of the fin and the surface of the register main body, the direction of the air-conditioned air can be changed smoothly and reliably.

As described above, in an air conditioning register relating to an aspect of the present invention, a reduction in the effective opening surface area of the air blow-out port can be prevented or effectively suppressed, and the air-conditioned air can be sent into the vehicle cabin interior efficiently.

In an air conditioning register relating to an aspect of the present invention, by operating the opening/closing part and selecting the air-conditioned air flow path which corresponds to the desired air-direction from among the plural air-conditioned air flow paths, the air-direction of the air-conditioned air can be controlled while a reduction in the effective opening surface area of the air blow-out port is prevented or effectively suppressed.

In an air conditioning register relating to an aspect of the present invention, the passage position of the air-conditioned air at the air-blow out port is changed in accordance with the direction of the flow of the air-conditioned air within the register main body. The air-direction of the air-conditioned air can thereby be controlled while a reduction in the effective opening surface area of the air blow-out port is prevented or effectively suppressed.

In an air conditioning register relating to an aspect of the present invention, by deforming the flow path shape changing part, the air-direction of the air-conditioned air can be controlled while a reduction in the effective opening surface area of the air blow-out port is prevented or effectively suppressed.

In an air conditioning register relating to an aspect of the present invention, by rotating the first air-conditioned air guiding member and the second air-conditioned air guiding member and changing the angles of inclination of the both, the shape of the flow path of the air-conditioned air within the register main body can be changed. In this way, the air-direction of the air-conditioned air can be controlled while a reduction in the effective opening surface area of the air blow-out port is prevented or effectively suppressed.

In an air conditioning register relating to an aspect of the present invention, at least one longitudinal direction end side of the fin, which is for changing the direction of the air-conditioned air in a direction intersecting the direction of changing the air-conditioned air by the air-direction controlling unit, is provided further toward the inner side of the air blow-out port than the surface of the register design portion. Therefore, the external appearance of the air blow-out port can be improved.

In an air conditioning register relating to an aspect of the present invention, the reinforcing member is provided at the inner side of the fin which is for changing the direction of the air-conditioned air in a direction intersecting the direction of changing the air-conditioned air by the air-direction controlling unit. The rigidity of the fin can thereby be improved, and therefore, the rigidity can be maintained even if the fin is formed to be long.

In an air conditioning register relating to an aspect of the present invention, the projecting portion is provided in a vicinity of the opening which is provided in the register design portion. Therefore, sticking of the air-conditioned air to the surface of the register design portion can be prevented or effectively suppressed, and the air-conditioned air can be directed effectively toward the vehicle cabin interior.

In an air conditioning register relating to an aspect of the present invention, by making the fin operation portion be the projecting portion, it suffices to not especially provide a projecting portion at the register design portion. The parts cost can be reduced, and a deterioration in the external appearance due to the special provision of a projecting portion at the register design portion can be prevented or suppressed.

In an air conditioning register relating to an aspect of the present invention, the shaft portion, which is provided coaxially with the rotational center of the fin and which is disposed in the hole portion formed in the register main body, is provided at one longitudinal direction end portion of the fin. Therefore, when the fin is rotated, either no gap arises between the end portion of the fin and the surface of the register main body, or such a gap can be made to be small. Therefore, the direction of the air-conditioned air can be changed smoothly and reliably.

In an air conditioning register relating to an aspect of the present invention, the radius from the rotation axis center to the outer peripheral portion of the shaft portion of the fin is set to be greater than or equal to a distance from the center of rotation of the fin to, among the both transverse direction ends of the fin, the end portion which is furthest from the center of rotation. Therefore, because no gap is made to arise between the end portion of the fin and the surface of the register main body at the time when the fin is rotated, the direction of the air-conditioned air can be changed even more smoothly and reliably.

BRIEF DESCRIPTION OF THE DRAWINGS

FIG. 11 is a perspective view of main portions of an air conditioning register relating to a third exemplary embodiment of the present invention;

FIG. 12 is a cross-sectional view of the main portions of the air conditioning register relating to the third exemplary embodiment of the present invention;

DETAILED DESCRIPTION OF THE INVENTION

Structure of First Exemplary Embodiment

Figure 1:
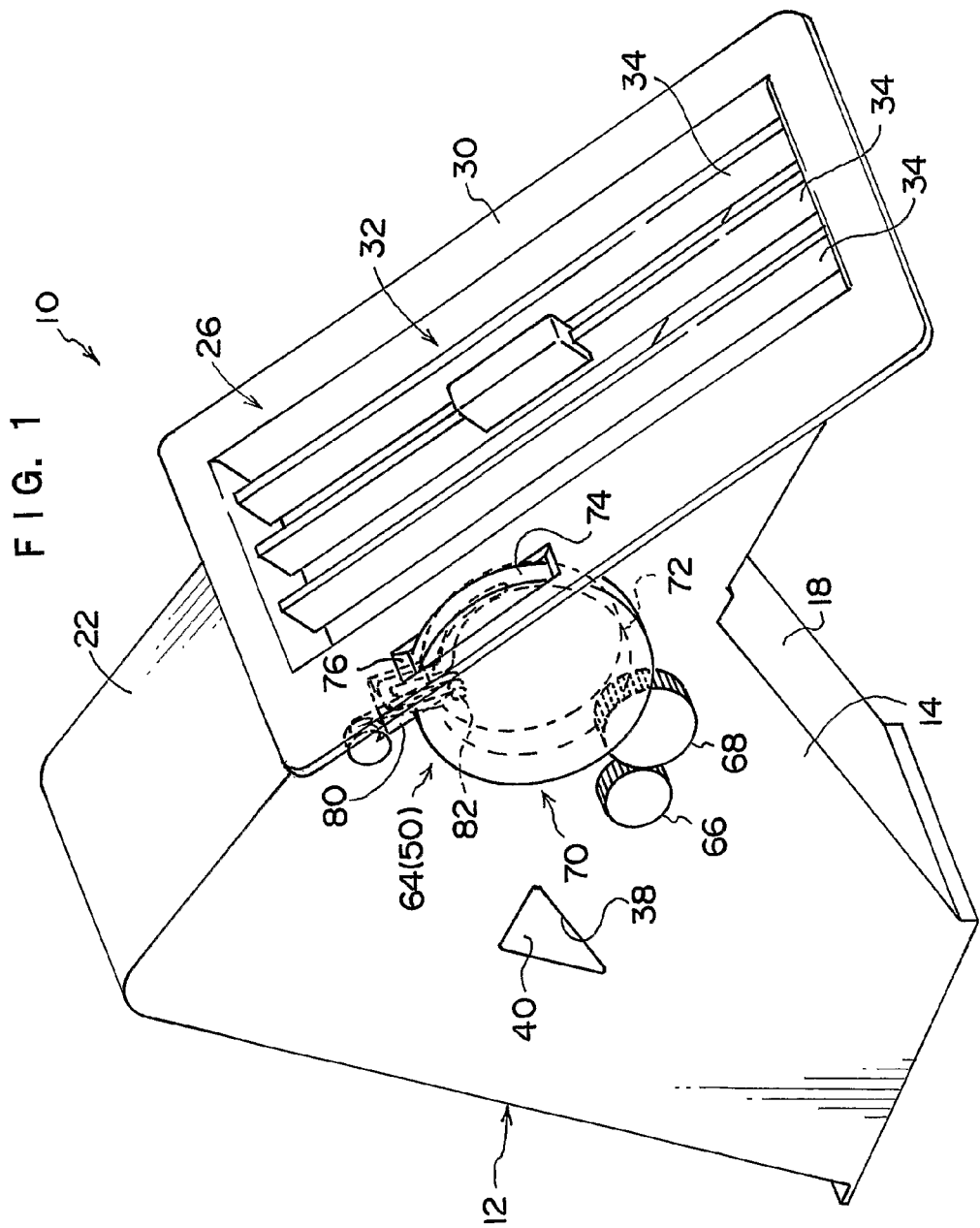
FIG. 1 is a perspective view of an air conditioning register relating to a first exemplary embodiment of the present invention.

The exterior of an air conditioning register 10 relating to a first exemplary embodiment of the present invention is shown in a perspective view in FIG. 1.

The air conditioning register 10 has a retainer 12 which serves as a register main body. The retainer 12 is set, for example, at the reverse surface side of the instrument panel (the engine room side of the instrument panel) which is provided at the front side of the driver's seat and the front passenger's seat of a vehicle. The retainer 12 has a pair of side walls 14 which oppose one another along the substantially transverse direction of the vehicle. (Only one of the side walls 14 is illustrated in FIG. 1.) A front wall 16 (see FIG. 3) is provided at the front side of the side walls 14 in the substantially longitudinal direction of the vehicle (which will simply be called "front" or "front side" hereinafter). The front ends of the side walls 14 are connected by the front wall 16. In contrast, an inclined wall 18 is provided at the rear side of the side walls 14 in the substantially longitudinal direction of the vehicle (which will simply be called "rear" or "rear side" hereinafter). The rear ends of the side walls 14 are connected by the inclined wall 18. The retainer 12 is formed overall in the shape of a tube having a rectangular cross-section, by the side walls 14, the front wall 16, and the inclined wall 18.

Figure 3:
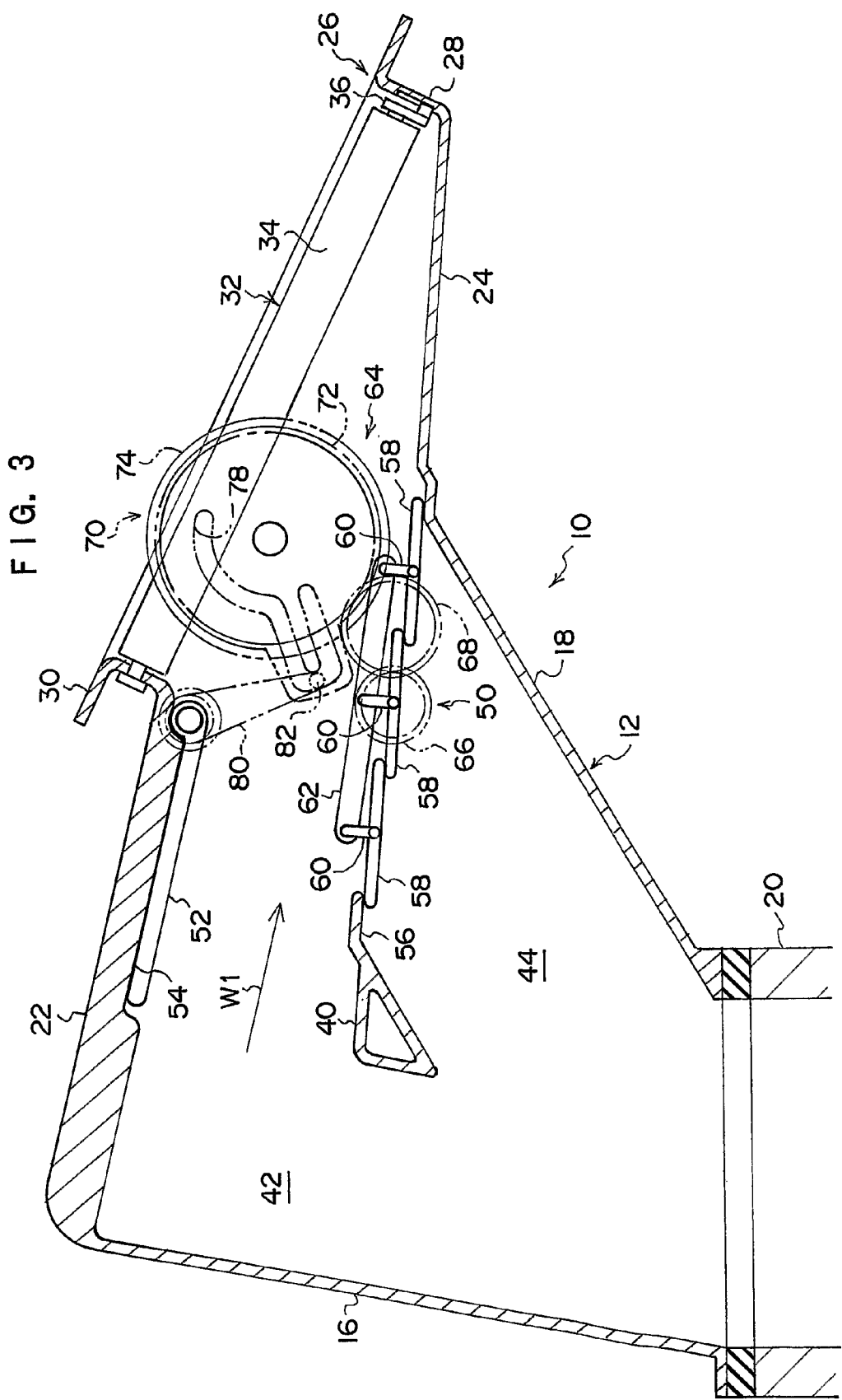
FIG. 3 is a cross-sectional view of the air conditioning register relating to the first exemplary embodiment of the present invention, and shows a state in which a first flow path is opened and a second flow path is closed.

The front wall 16 and the inclined wall 18 are both shaped as plates which are inclined from the front side toward the rear side. However, the angles of inclination in directions around axes, whose axial directions are the substantially transverse direction of the vehicle, differ at the inclined wall 18 and the front wall 16. As compared with the front wall 16, the inclined wall 18 is inclined greatly with respect to the substantially vertical direction of the vehicle. Therefore, the outer peripheral configuration and the inner peripheral configuration of the retainer 12 become larger toward the upper side in the substantially vertical direction of the vehicle (which will hereinafter simply be called "top" or "upper side"). As shown in FIG. 3, the lower end of the retainer 12 is open, and the open end at the upper side of a wind guiding portion 20 is connected to this open lower end of the retainer 12. The wind guiding portion 20 is connected to an air conditioner main body which is structured by driving unit such as a blower motor and the like, a cooling cycle mechanism such as a compressor, an evaporator, a condenser and the like, and a heater, and the like. Air-conditioned air which is generated at the air conditioner main body passes through the wind guiding portion 20 and is sent into the retainer 12.

On the other hand, as shown in FIG. 1 and FIG. 3, a top wall 22 extends rearward from the top end of the front wall 16. As shown in FIG. 3, the both end portions in the substantially vehicle transverse direction of the top wall 22 are connected to the top end portions of the side walls 14. The top end of the retainer 12, at the side further toward the front than the intermediate portion thereof in the substantially vehicle longitudinal direction, is closed by the top wall 22. Further, as shown in FIG. 3, a bottom wall 24 extends rearward from the top end of the inclined wall 18. In correspondence with the bottom wall 24, the side walls 14 extend further toward the rear than the inclined wall 18, and the substantially vehicle transverse direction both end portions of bottom wall 24 are connected to the side walls 14. A blow-out bezel 26 serving as an air blow-out port is provided at the rear side end portions of the top wall 22 and the bottom wall 24 and at the end portions of the side walls 14 corresponding to these portions. A peripheral wall portion 28 is formed at the blow-out bezel 26 along the respective rear side end portions of the top wall 22, the bottom wall 24, and the both side walls 14. The shape of the opening of the peripheral wall portion 28 is formed to be rectangular. A flange portion 30 serving as a register design portion extends from the distal end of the peripheral wall portion 28, toward the outer side substantially orthogonal to the direction of opening.

The flange portion 30 corresponds to a rectangular hole portion which is formed in, for example, the instrument panel which is provided in the vehicle cabin. In a state in which the retainer 12 is disposed at a predetermined position at the reverse surface side of the instrument panel, the flange portion 30 is fit-in this hole portion. Further, as shown in FIG. 1, a left-right air-direction regulating portion 32 is provided at the blow-out bezel 26. The left-right air-direction regulating portion 32 has plural (three in the present exemplary embodiment) left-right regulating fins 34.

Each of the left-right regulating fins 34 is formed in the shape of a narrow plate whose longitudinal direction runs along the direction in which the rear end portion of the top wall 22 and the rear end portion of the bottom wall 24 oppose one another (i.e., a direction which is inclined by a predetermined angle from the front toward the rear). The longitudinal direction end portions of each of the left-right regulating fins 34 are pivotally-supported at the peripheral wall portion 28 so as to rotate freely over a predetermined range. Due to the left-right regulating fin 34 rotating, the transverse direction thereof can be inclined in the substantially vehicle transverse direction. Moreover, one longitudinal direction end of each of the left-right regulating fins 34 is connected to a connecting piece 36 such that, when any one of the left-right regulating fins 34 rotates, the other left-right regulating fins 34 rotate interlockingly therewith.

As shown in FIG. 1, opening portions 38, whose opening configurations are substantially triangular, are formed in the side walls 14. As shown in FIG. 3, a partitioning portion 40 is provided at the inner side of the retainer 12 so as to correspond to the opening portions 38. The partitioning portion 40 is formed in the shape of a tube which passes through along the direction in which the side walls 14 oppose one another. The inner peripheral configuration of the partitioning portion 40 is shaped as a triangle which corresponds to the inner peripheral configurations of the opening portions 38. One end of the partitioning portion 40 is connected to one of the side walls 14, whereas the other end is connected to the other of the side walls 14. By providing this partitioning portion 40 at the inner side of the retainer 12, the flow path of the air-conditioned air within the retainer 12 is divided into a first flow path 42 and a second flow path 44. The first flow path 42 is structured so as to include the space between the front wall 16, the top wall 22, and the partitioning portion 40. The second flow path 44 is structured so as to include the space between the inclined wall 18 and the partitioning portion 40.

When the air-conditioned air, which is sent into the retainer 12 from the wind guiding portion 20, flows into the first flow path 42, the air-conditioned air first flows upward along the surface of the front wall 16, and thereafter, the direction thereof is changed toward the rear (the direction of arrow W1 in FIG. 3) along the surface to the top wall 22. When the air-conditioned air, which is sent into the retainer 12 from the wind guiding portion 20, flows into the second flow path 44, the air-conditioned air flows in the direction of arrow W2 in FIG. 4 which is inclined upward along the surface of the inclined wall 18.

Figure 4:
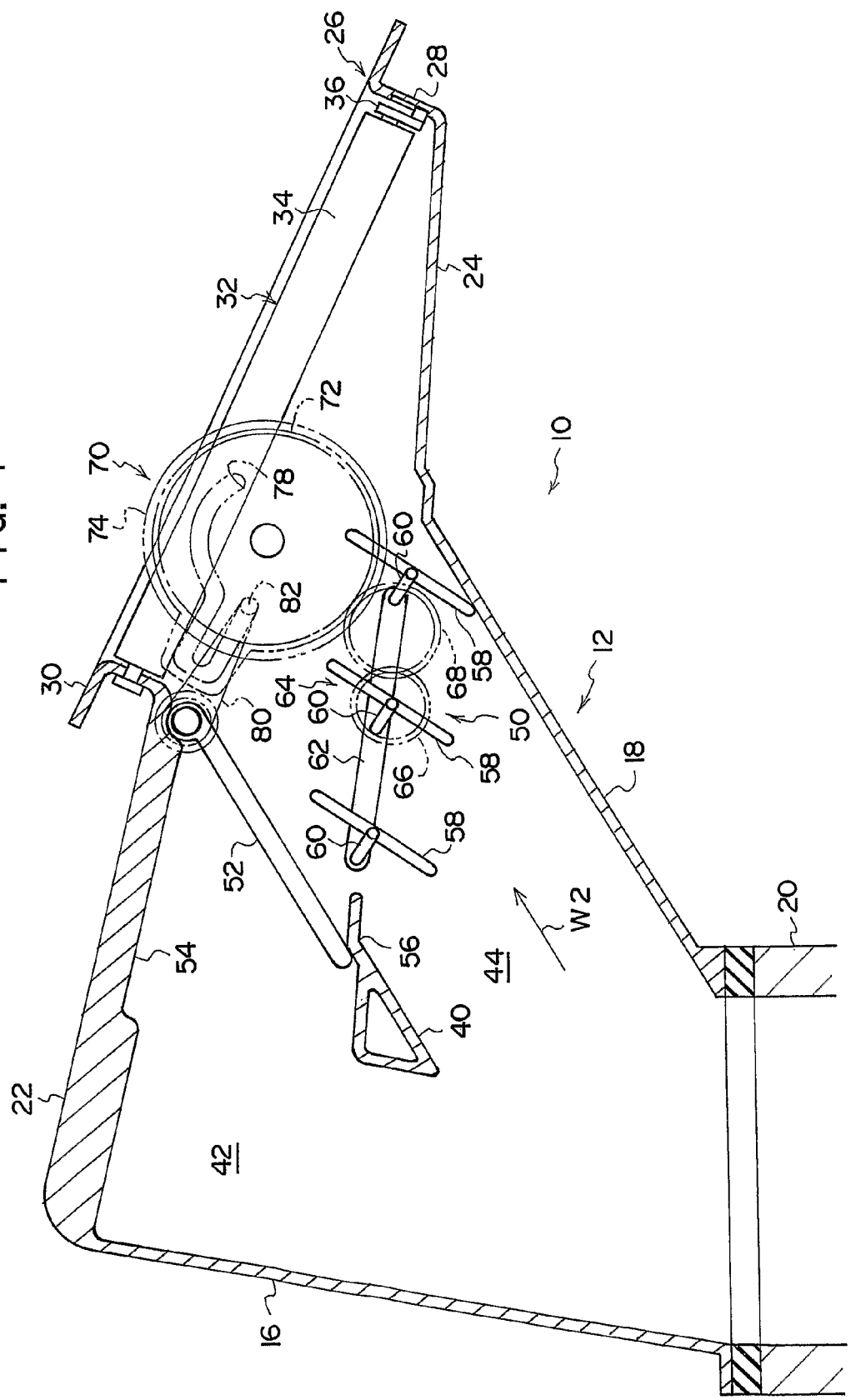
FIG. 4 is a cross-sectional view corresponding to FIG. 3 and showing a state in which the first flow path is closed and the second flow path is opened.

As shown in FIG. 3 and FIG. 4, the direction of arrow W1, which runs along the surface of the top wall 22 at the inner side of the retainer 12, and the direction of arrow W2, which runs along the surface of the inclined wall 18 at the retainer 12 side, are both directed rearward. However, the direction of arrow W2 is inclined upward with respect to the direction of arrow W1.

Figure 2:
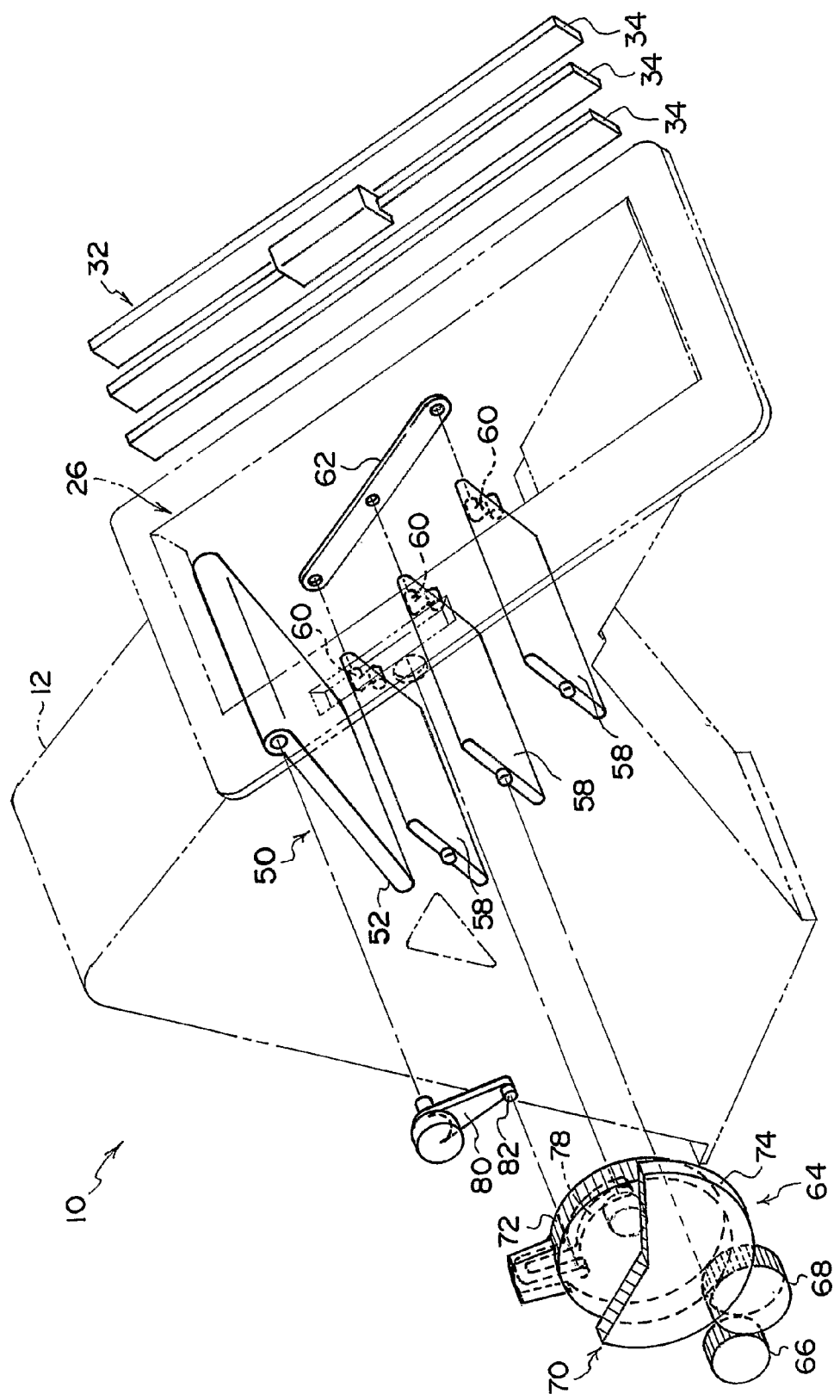
FIG. 2 is an exploded perspective view showing the structure of an air-direction controlling unit of the air conditioning register relating to the first exemplary embodiment of the present invention.

As shown in FIG. 2 and FIG. 3, a flow path switching mechanism 50, which structures an air-direction controlling unit by an opening/closing part, is provided in the retainer 12 so as to correspond to the blow-out bezel 26 side area of the first flow path 42 and the second flow path 44. The flow path switching mechanism 50 has a first damper 52. The first damper 52 is formed in the shape of a rectangular plate whose transverse direction dimension corresponds to the interval between the side walls 14. The first damper 52 can rotate around an axis, whose axial direction is the transverse direction. The center of the rotation is set at one end side in the longitudinal direction of the first damper 52, the longitudinal direction thereof is orthogonal to the transverse direction. An accommodating portion 54 is formed at the top wall 22 in correspondence with the first damper 52. The accommodating portion 54 is formed by making a portion of the top wall 22 be thin-walled. As shown in FIG. 3, the accommodating portion 54 accommodates the first damper 52 at the inner side of the top wall 22 at the time when the other longitudinal direction end portion of the first damper 52 is rotated as much as possible toward the top wall 22.

In this way, in the state in which the first damper 52 is accommodated in the accommodating portion 54, the blow-out bezel 26 side of the first flow path 42 is opened, and the air-conditioned air can pass through the first flow path 42.

Further, an abutting piece 56 extends from the partitioning wall 40 toward the top end portion of the inclined wall 18. When the longitudinal direction other end portion of the first damper 52 is rotated as much as possible in the direction of moving away from the top wall 22, the longitudinal direction other end portion thereof abuts the abutting piece 56 as shown in FIG. 4. In this state, the blow-out bezel 26 side of the first flow path 42 is closed by the first damper 52, and the air-conditioned air cannot pass through the first flow path 42.

The flow path switching mechanism 50 also has plural second dampers 58. The second dampers 58 are formed in the shapes of flat plates whose longitudinal direction is the direction in which the side walls 14 oppose one another. Each of the second dampers 58 can rotate by a predetermined angle around an axis, whose axial direction is the longitudinal direction, with the center of rotation being the substantially central portion in the short-side direction thereof. The sum of the short-side dimensions of the respective second dampers 58 is longer than the interval between the distal end portion of the abutting piece 56 and the top end portion of the inclined wall 18. When the second dampers 58 are rotated such that the short-side directions of the second dampers 58 are as close as possible to the direction from the distal end portion of the abutting piece 56 toward the top end portion of the inclined wall 18, as shown in FIG. 4, the adjacent second dampers 58 overlap one another in a state of abutting each other, and the second damper 58 at the inclined wall 18 side abuts the top end portion of the inclined wall 18, and the second damper 58 at the abutting piece 56 side abuts the abutting piece 56. In this state, the second flow path 44 is closed between the distal end portion of the abutting piece 56 and the top end portion of the inclined wall 18, and the air-conditioned air cannot pass through the second flow path 44. When the second dampers 58 are rotated from this state, the air-conditioned air can flow through between the adjacent second dampers 58 to one another as well as between the second dampers 58 and the abutting piece 56, inclined wall 18.

One end of a link 60 is connected to the substantially central portion in the short-side direction, at a longitudinal direction one end portion of each of the second dampers 58. The other ends of the links 60 are connected by a connecting piece 62 at positions which are away from the centers of rotation of the second dampers 58. When any one of the second dampers 58 rotates, the other second dampers 58 rotate in the same direction by the same angle interlockingly therewith.

The longitudinal direction other end portion of one of the second dampers 58 among the plural second dampers 58 is connected to a gear 66 which structures an interlocking mechanism 64 for causing the first damper 52 and the second dampers 58 to operate interlockingly. The gear 66 is supported at the side wall 14 so as to rotate freely at the outer side of the retainer 12. The shaft portion of the second damper 58, which passes through the side wall 14, is connected coaxially and integrally with the gear 66. The gear 66 meshes with a gear 68 which is supported at the side wall 14 so as to rotate freely at the side of the gear 66. The gear 68 meshes with a gear 72 of an operation dial 70 which is supported at the side wall 14 so as to rotate freely at the side of the gear 68. The operation dial 70 has a dial portion 74. The dial portion 74 is formed in the shape of a disc having a larger diameter than the gear 72, and is connected coaxially and integrally to the gear 72.

As shown in FIG. 1, a portion of the dial portion 74 projects-out from a slit-shaped opening portion 76 which is formed in the flange portion 30, such that a portion of the outer periphery of the dial portion 74 is exposed at the vehicle cabin interior side. In this way, the dial portion 74 can be operated and rotated from within the vehicle cabin. Further, as shown in FIG. 2 and FIG. 3, an opening portion, which opens at the surface side opposite the dial portion 74, is formed in the gear 72. A pin 82A which is formed to project from a swinging arm 80 is disposed in this opening portion from the distal end of a guide groove 78. The guide groove 78 is formed at the side of the operation dial 70. The proximal end side of the swinging arm 80 is supported at the side wall 14 so as to rotate freely. Due to the operation dial 70 rotating, the pin 82 is guided by the guide groove 78, and the swinging arm 80 thereby swings. The center of swinging of the swinging arm 80 is connected integrally to one transverse direction end portion of the first damper 52 at one longitudinal direction end side thereof. When the operation dial 70 rotates, both the first damper 52 and the second dampers 58 rotate by predetermined angles in accordance with the angle of rotation of the operation dial 70.

Operation of First Exemplary Embodiment

The operation of the present exemplary embodiment will be described next.

In the air conditioning register 10 relating to the present exemplary embodiment, when the operation dial 70 is operated and rotated in one direction around the axis thereof, interlockingly with the rotation of the operation dial 70, the first damper 52 rotates, and the longitudinal direction other end portion of the first damper 52 approaches the top wall 22. Further, when the operation dial 70 is rotated in this way, the second dampers 58 rotate interlockingly therewith. As shown in FIG. 3, when the first damper 52 rotates to being accommodated in the accommodating portion 54, the short-side directions of the respective second dampers 58 are as close as possible to the direction from the distal end portion of the abutting piece 56 to the top end portion of the inclined wall 18.

In this state, as described above, the adjacent second dampers 58 overlap one another in a state of abutting each other, and the second damper 58 at the inclined wall 18 side abuts the top end portion of the inclined wall 18, and the second damper 58 at the abutting piece 56 side abuts the abutting piece 56. Accordingly, the first flow path 42 is opened, and the second flow path 44 is closed. The air-conditioned air, which flows through the first flow path 42, flows into the vehicle cabin from the blow-out bezel 26 in a state in which the air-direction thereof is the direction of arrow W1 in FIG. 3.

On the other hand, when, from the state shown in FIG. 3, the operation dial 70 is operated and rotated in the other direction around the axis thereof, the longitudinal direction other end portion of the first damper 52, which is interlocked with the rotation of the operation dial 70, rotates so as to move away from the top wall 22. When the operation dial 70 is rotated in this way, the second dampers 58, which are interlocked therewith, rotate and overlapping portions thereof move apart from one another, and the portions of the second dampers 58 which were abutting the inclined wall 18 or the abutting piece 56 move apart from the inclined wall 18 or the abutting piece 56.

Due to the operation dial 70 rotation, as shown in FIG. 4, the longitudinal direction other end portion of the first damper 52 abuts the abutting piece 56 such that the first flow path 42 is closed, and, due to the overlapping portions of the second dampers 58 moving apart from one another and the portions of the second dampers 58, which were abutting the inclined wall 18 or the abutting piece 56, moving apart from the inclined wall 18 or the abutting piece 56, the second flow path 44 is opened. In this way, the air-conditioned air passes through the second flow path 44. As described above, the air-direction of the air-conditioned air which passes through the second flow path 44 is indicated with the arrow W2 in FIG. 4, and is inclined more upwardly than the air-direction of the air-conditioned air which passes through the first flow path 42 (i.e., the direction of arrow W1 in FIG. 3).

In the present air conditioning register 10, as described above, when the air-direction of is to be changed up or down, the operation dial 70 is rotated, the first damper 52 and the second dampers 58 are rotated, and the flow path through which the air-conditioned air passes is thereby switched from either one of first flow path 42 and the second flow path 44 to the other. In this way, in order to change the air-direction in the vertical direction, the flow path itself of the air-conditioned air is switched. Therefore, as compared with the case of the conventional fins which change the air-direction at the same flow path, there is little resistance to the air-conditioned air. In this way, the blow-out efficiency of the air-conditioned air is good, and the generation of noise, such as a wind cutting sound or the like, and vibration can be effectively suppressed or prevented.

Further, in changing the air-direction upward or downward, the flow path is merely switched from either one of the first flow path 42 and the second flow path 44 to the other. The effective opening surface area, through which the air-conditioned air of the first flow path 42 and the second flow path 44 pass, is not reduced. There is no reduction in the blow-out range of the air-conditioned air, or the like, accompanying a reduction in the effective opening surface area as is the case with the conventional fins which change the air-direction at the same flow path. Accordingly, the air-conditioned air can be sufficiently blown-out upwardly and downwardly.

Structure of Second Exemplary Embodiment

Another exemplary embodiment of the present invention will be described next. Note that, in describing the respective exemplary embodiments hereinafter, regions which are basically the same as those of exemplary embodiments preceding that being described, including the above-described first exemplary embodiment, are denoted by the same reference numerals, and detailed description thereof is omitted.

Figure 5:
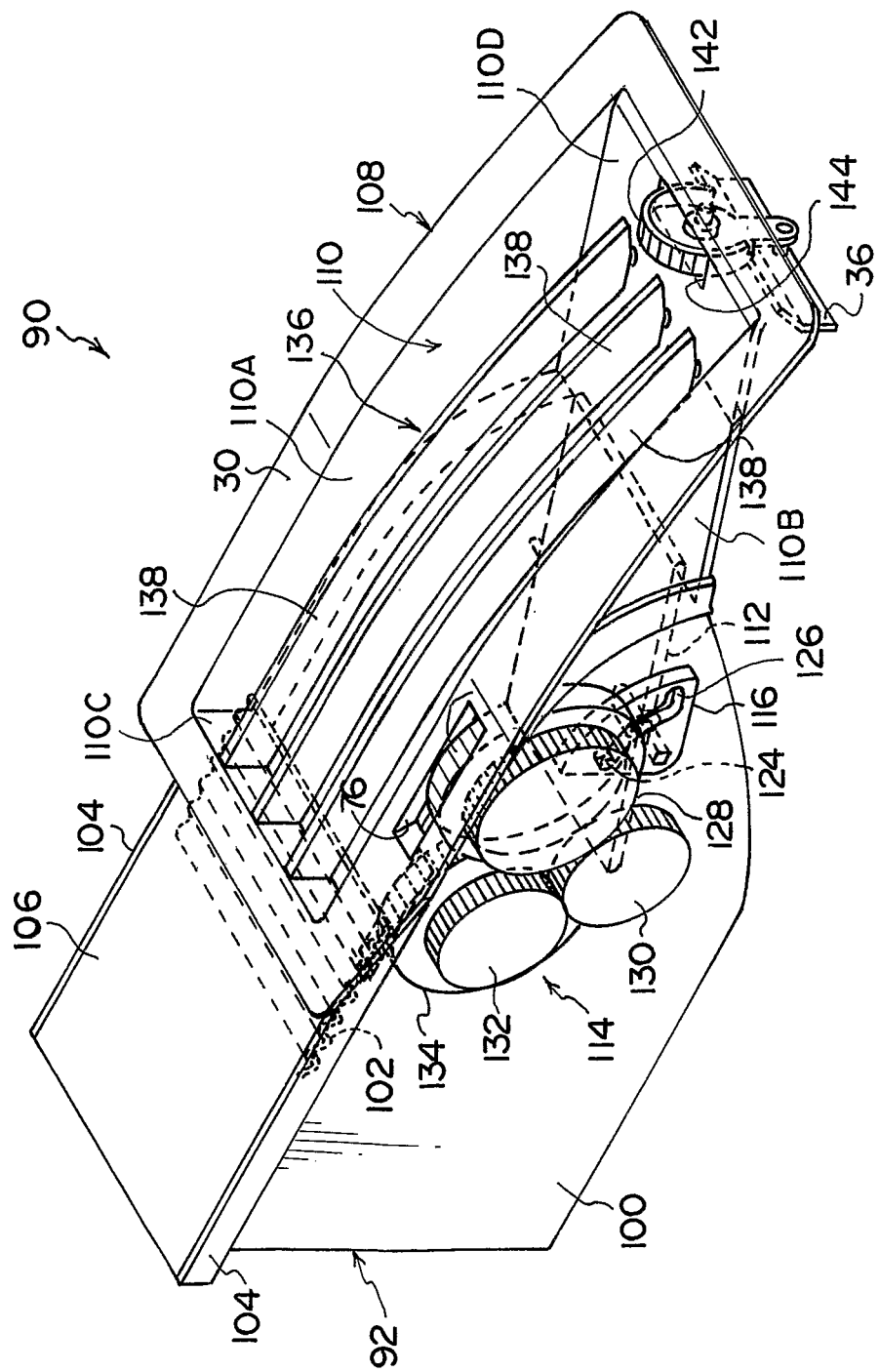
FIG. 5 is a perspective view of an air conditioning register relating to a second exemplary embodiment of the present invention.
Figure 6:
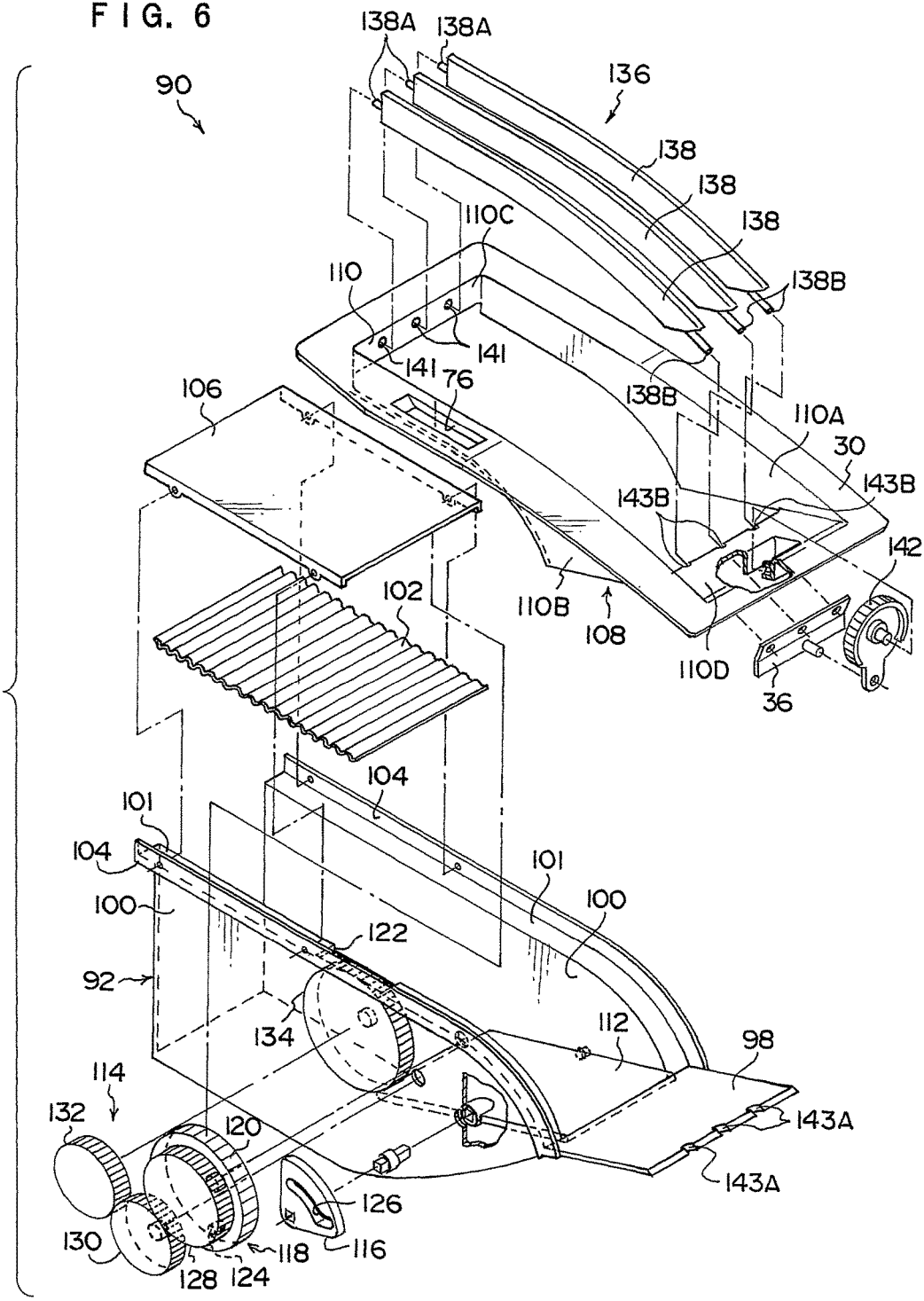
FIG. 6 is an exploded perspective view of the air conditioning register relating to the second exemplary embodiment of the present invention.
Figure 7:
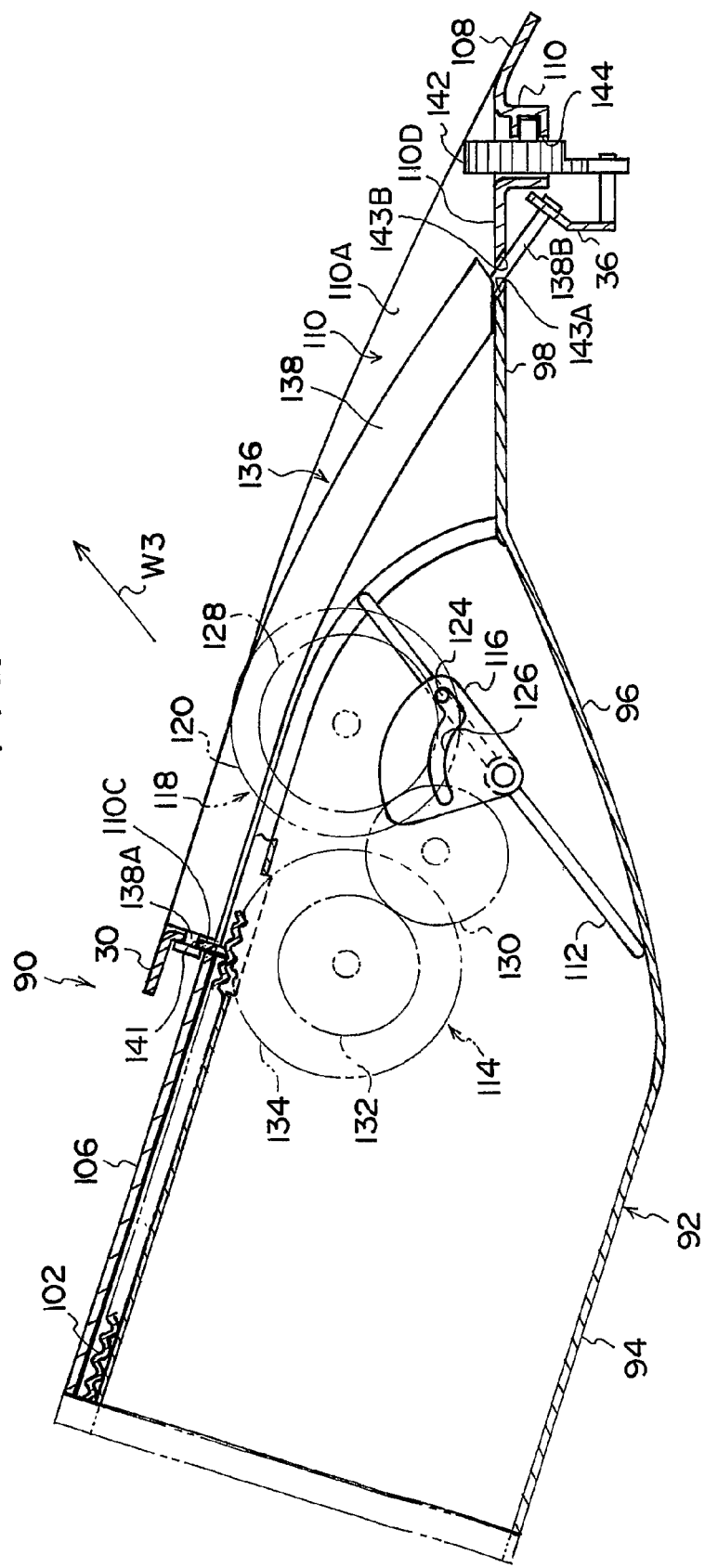
FIG. 7 is a cross-sectional view of the air conditioning register relating to the second exemplary embodiment of the present invention.

The exterior of an air conditioning register 90 relating to a second exemplary embodiment of the present invention is shown in a perspective view in FIG. 5. An exploded perspective view of the air conditioning register 90 is shown in FIG. 6. The air conditioning register 90 has, as the register main body, a retainer 92 which replaces the retainer 12 of the above-described first exemplary embodiment. As shown in FIG. 7, the retainer 92 has a first floor wall 94. The first floor wall 94 is shaped as a flat plate which is inclined downward from the front side toward the rear side. A second floor wall 96 is formed in continuation from the rear side end portion of the first floor wall 94. The second floor wall 96 is shaped as a flat plate which is inclined upward from the front side toward the rear side. The cross-sectional configuration formed on the whole by the first floor wall 94 and the second floor wall 96 is V-shaped.

An extended wall 98 shaped as a flat plate extends further rearward from the rear side end portion of the second floor wall 96. Side walls 100 stand erect upwardly from the both transverse direction end portions of the first floor wall 94 and the second floor wall 96. Of the top end portions of the side walls 100, the portions thereof which position from the front end side to the intermediate portions in the substantially longitudinal direction of the vehicle, are inclined parallel to the first floor wall 94. At the rear side of these portions which are inclined parallel to the first floor wall 94, the top end portions of the side walls 100 are curved so as to approach the rear side end portion of the second floor wall 96. Flange portions 101 extend from the top end portions of the side walls 100 toward the transverse direction outer sides of the retainer 92. A shutter 102, which structures an air-direction controlling unit as a passage position changing part, is disposed on the flange portions 101.

The shutter 102 is formed either in the shape of a plate at which thick-walled portions and thin-walled portions are formed alternately along the longitudinal direction thereof, or in the shape of a wavy plate at which recesses and protrusions are formed alternately at one side in the thickness direction. The shutter 102 is movable only along the top end portions of the side walls 100 on the flange portions 101, by guide walls 104 and a top wall 106. The guide walls 104 stand erect from the flange portions 101 and the top wall 106, from above, closes the portion of the retainer 92 from the front side to the intermediate portion thereof in the substantially vehicle longitudinal direction.

As shown in FIG. 5 and FIG. 6, a blow-out bezel 108, which replaces the blow-out bezel 26 of the above-described first exemplary embodiment, is provided on the retainer 92. The blow-out bezel 108 has the flange portion 30. A peripheral wall 110, which replaces the peripheral wall portion 28 of the above-described first exemplary embodiment, is formed at one surface in the direction of thickness of the flange portion 30. The peripheral wall 110 has a pair of lateral wall portions 110A, 110B which oppose one another in the substantially transverse direction of the vehicle. The pair of lateral wall portions 110A, 110B are inclined from the front side toward the rear side, and the substantially vehicle longitudinal direction is approximately the longitudinal directions thereof. Further, the short-side directions of the lateral wall portions 110A, 110B run along the vehicle vertical direction. One end portion in the short-side direction of each of the lateral wall portions 110A, 110B (i.e., the end portions at the side opposite the flange portion 30) are curved or bent appropriately in accordance with the configurations of the top end portions of the flange portions 101 of the retainer 92 and the extended wall 98.

A front wall portion 110C, which, together with the lateral wall portions 110A, 110B, structures the peripheral wall 110, is provided between the front side end portions of the pair of lateral wall portions 110A, 110B. In contrast, a rear wall portion 110D, which, together with the lateral wall portions 110A, 110B and the front wall portion 110C, structures the peripheral wall 110, is provided between the rear side end portions of the pair of lateral wall portions 110A, 110B. The direction of thickness of the rear wall portion 110D is set to be the same direction as the direction of thickness of the extended wall 98. The front side end portion of the rear wall portion 110D opposes and is thrust against the rear side distal end of the extended wall 98 (the end portion thereof at the side opposite the second floor wall 96), in a state in which ones of ends of the lateral wall portions 110A, 110B abut the flange portions 101. In this way, in the state in which the end portion of the rear wall portion 110D and the distal end of the extended wall 98 are thrust against one another, from the proximal end of the extended wall 98 (the second floor wall 96 side end portion) to the rear side (flange portion 30 side) end portion of the rear wall portion 110D, one surface in the thickness direction (the top surface) of the extended wall portion 98 and of the rear wall portion 110D is formed in the shape of a curved surface or a flat surface at which there are no steps. When the air-conditioned air flows above the one surfaces in the thickness direction of the extended wall 98 and the rear wall portion 110D, either there is no region which provides resistance, or the region which provides resistance is extremely small.

A left-right air-direction regulating portion 136, which replaces the left-right air-direction regulating portion 32 of the above-described first exemplary embodiment, is provided at the inner side of the peripheral wall 110 of the above-described structure. Plural (three in the present exemplary embodiment) left-right regulating fins 138 are provided at the left-right air-direction regulating portion 136.

The left-right regulating fins 138 are disposed so as to be positioned further toward the peripheral wall 110 side than the flange portion 30. The left-right regulating fins 138 are structured so as to be able to rotate around axes, whose axial directions are inclined from the front toward the rear and are approximately parallel to the surface of the flange portion 30 at the vehicle cabin interior side. Shaft portions 138A formed at one ends of the fins 138 (at the front, upper sides) are pivotally-supported in shaft-receiving holes 141 which are formed in the front wall portion 110C. In contrast, substantially semicircular cut-out portions 143A are formed in the distal end of the extended wall 98 in correspondence with the other ends of the left-right regulating fins 138. Semicircular cut-out portions 143B are formed in the front side end (the end portion at the side opposite the flange portion 30) of the rear wall portion 110D of the peripheral wall 110, so as to correspond to these cut-out portions 143A.

As shown in FIG. 7, in a state in which ones of ends of the lateral wall portions 110A, 110B of the peripheral wall 110 abut the flange portions 101, and the front side end portion of the rear wall portion 110D (the end portion at the side opposite the flange portion 30) is thrust against so as to oppose the rear side distal end of the extended wall 98 (the end portion at the side opposite the second floor wall 96), circular hole portions are formed by the cut-out portions 143A and the cut-out portions 143B opposing one another. Other shaft portions 138B of the respective left-right regulating fins 138 pass through the hole portions which are structured by the cut-out portions 143A and the cut-out portions 143B.

The shaft portions 138B, which pass through the hole portions structured by the cut-out portions 143A and the cut-out portions 143B, are mechanically connected to one another by the connecting piece 36 at the reverse surface side of the rear wall portion 110D. Further, in the present exemplary embodiment, an operation dial 142 (one aspect of a projecting portion), which serves as a fin operation portion, is mechanically connected to the connecting piece 36. The operation dial 142 passes through a rectangular opening portion 144 formed in the extended wall 98, and projects-out at the upper side of the extended wall 98. However, the operation dial 142 does not project-out upper than the surface of the flange portion 30 of the blow-out bezel 108, and is kept within the same height in vehicle up and down direction of the peripheral wall 110. By rotating this operation dial 142, the connecting piece 36 moves, and, interlockingly with the movement of the connecting piece 36, the respective left-right regulating fins 138 rotate.

Figure 10:
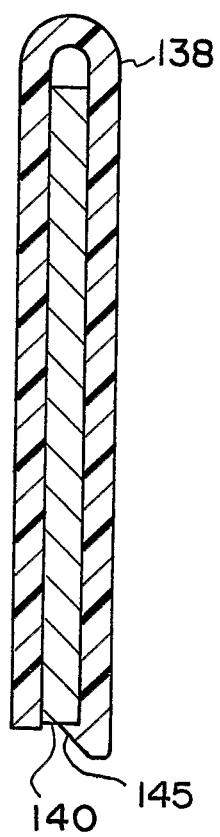
FIG. 10 is a cross-sectional view of a fin.

The left-right regulating fins 138 having the above-described structure are formed in the shapes of narrow plates similar to the left-right regulating fins 34 in the above-described first exemplary embodiment. However, the left-right regulating fins 34 are merely formed of a synthetic resin material, whereas, as shown in FIG. 10, the left-right regulating fins 138 are formed so as to be bent in a substantial U-shape or a substantial V-shape around an axis whose axial direction is the longitudinal direction. A reinforcing member 140 is nipped-in at the inner side of the left-right regulating fin 138. The reinforcing member 140 is, for example, formed in the shape of a flat plate which is narrow and thin-walled, of a material such as iron or the like which has a higher rigidity than that of the synthetic resin material forming the left-right regulating fins 138.

A claw portion 145 is formed at one side of the left-right regulating fin 138, with the bent portion of the substantial-U shape or the substantial V-shape in cross-sections being the border between the sides of the left-right regulating fin 138.

The claw portion 145 is formed at the opening end side of the left-right regulating fin 138 as seen in cross-section, and restricts displacement of the reinforcing member 140 toward the side opposite the bent portion of the left-right regulating fin 138. In this way, the reinforcing member 140 can be prevented from coming-out from the left-right regulating fin 138, even if the reinforcing member 140 is not adhered and fixed to the left-right regulating fin 138 by an adhesive or the like, or is not fixed to the left-right regulating fin 138 by screws.

In this way, for example, if the respective length, width and depth dimensions of the left-right regulating fin 138 and the left-right regulating fin 34 are the same, the left-right regulating fin 138, at whose inner side the reinforcing member 140 is nipped, is more rigid than the left-right regulating fin 34.

Further, at the peripheral wall 110, the lower end portions of the lateral wall portions 110A, 110B (i.e., the end portions at the side opposite the flange portion 30) are curved in correspondence with the curvature of the curved portions of the top end portions of the side walls 100 which are positioned from the intermediate portions to the rear side thereof in the substantially vehicle longitudinal direction. When the shutter 102 has entered-in at the lower sides of these curved portions, the peripheral wall 110 curves the shutter 102 such that the shutter 102 corresponds to the curvature of the top end portions of the side walls 100.

As shown in FIG. 6 and FIG. 7, a damper 112, which structures a passage position changing part together with the shutter 102 and which structures the air-direction controlling unit as a deflecting part, is provided above the second floor wall 96. The damper 112 is formed in the shape of a plate whose longitudinal direction is provided along the longitudinal direction of the vehicle, and whose widthwise dimension in the short-side direction is only slightly shorter than the interval between the both side walls 100. The damper 112 is pivotally supported, at a position higher than the second floor wall 96, at the side walls 100 so as to be able to rotate around an axis whose axial direction is the transverse direction. The center of rotation is set at the substantially central portion in the longitudinal direction. As shown in FIG. 6, a cam plate 116 which structures an interlocking mechanism 114 is disposed at the outer side of the side wall 100 in correspondence with the damper 112. The cam plate 116 is mechanically connected to the damper 112 in a state in which rotation of cam plate 116 with respect to the damper 112 is prevented, and the damper 112 and the cam plate 116 rotate integrally. At a side of the cam plate 116, an operation dial 118 is pivotally-supported at the side wall 100 so as to rotate freely around an axis whose axial direction is the substantially transverse direction of the vehicle.

The operation dial 118 has a disc-shaped dial portion 120. A portion of the dial portion 120 projects-out from a slit-shaped opening portion 122 which is formed in the flange portion 101 and from the opening portion 76 of the flange portion 30, such that a portion of the outer periphery of the dial portion 120 is exposed at the vehicle cabin interior side. In this way, the operation dial 118 can be operated and rotated from the vehicle cabin interior. A pin 124 is formed to project in the axial direction from a vicinity of the outer periphery of the dial portion 120.

The pin 124 is formed so as to be away from the rotational center of the operation dial 118. When the operation dial 118 rotates, the pin 124 rotates around the rotational center of the operation dial 118 together with the dial portion 120. This pin 124 is disposed in a guide hole 126 which is formed in the cam plate 116. When the pin 124 rotates around the rotational center of the operation dial 118, the pin 124 pushes the inner wall of the guide hole 126 and rotates the cam plate 116. In this way, the damper 112 rotates interlockingly with the rotation operation of the operation dial 118.

A gear portion 128 is provided coaxially at the outer peripheral portion of the dial portion 120. The gear portion 128 meshes-together with a gear 130 which is pivotally-supported at the side wall 100 so as to rotate freely. Further, the gear 130 meshes-together with a gear 132 which is pivotally-supported at the side wall 100 so as to rotate freely, at the side of the gear 130. A gear 134 is provided coaxially and integrally with one axial direction end portion of the gear 132. External teeth formed at the outer peripheral portion of the gear 134 correspond to the protrusions and recesses of the thickness direction bottom surface of the shutter 102, and the external teeth of the gear 134 mesh-together with the protrusions and recesses of the bottom surface of the shutter 102. Therefore, when the rotation of the operation dial 118 is transmitted to the gear 134 via the gear portion 128, the gear 130 and the gear 132, the gear 134 rotates and the shutter 102 is moved along the top end portions of the side walls 100.

Operation of Second Exemplary Embodiment

The operation and effects of the present exemplary embodiment will be described next.

In the air conditioning register 90 relating to the present exemplary embodiment, when the operation dial 118 is operated and rotated around its axis, interlockingly with the rotation of the operation dial 118, the gear 134 rotates, and the shutter 102 moves forward or rearward. Therefore, when the operation dial 118 is operated and rotated as greatly as possible in one direction around the axis thereof, as shown in FIG. 7, the majority of or all of the shutter 102 is accommodated at the lower side of the top wall 106. On the other hand, when the operation dial 118 is operated and rotated as greatly as possible in the other direction around the axis thereof, as shown in FIG. 9, the majority of or all of the shutter 102 is pulled-out from the top wall 106.

When the operation dial 118 is operated and rotated in the one direction around the axis thereof, interlockingly therewith, the cam plate 116 rotates and the damper 112 rotates. When the operation dial 118 is operated and rotated as greatly as possible in the one direction around its axis, the front side end portion of the damper 112 abuts the second floor wall 96, and the thickness direction top surface of the damper 112 is inclined as much as possible toward the front side (see FIG. 7). In this state, the air-direction of the air-conditioned air which is sent into the retainer 92 is changed to the direction of arrow W3 in FIG. 7 which is parallel to the top surface of the damper 112, and the air-conditioned air is sent into the vehicle cabin interior.

Figure 8:
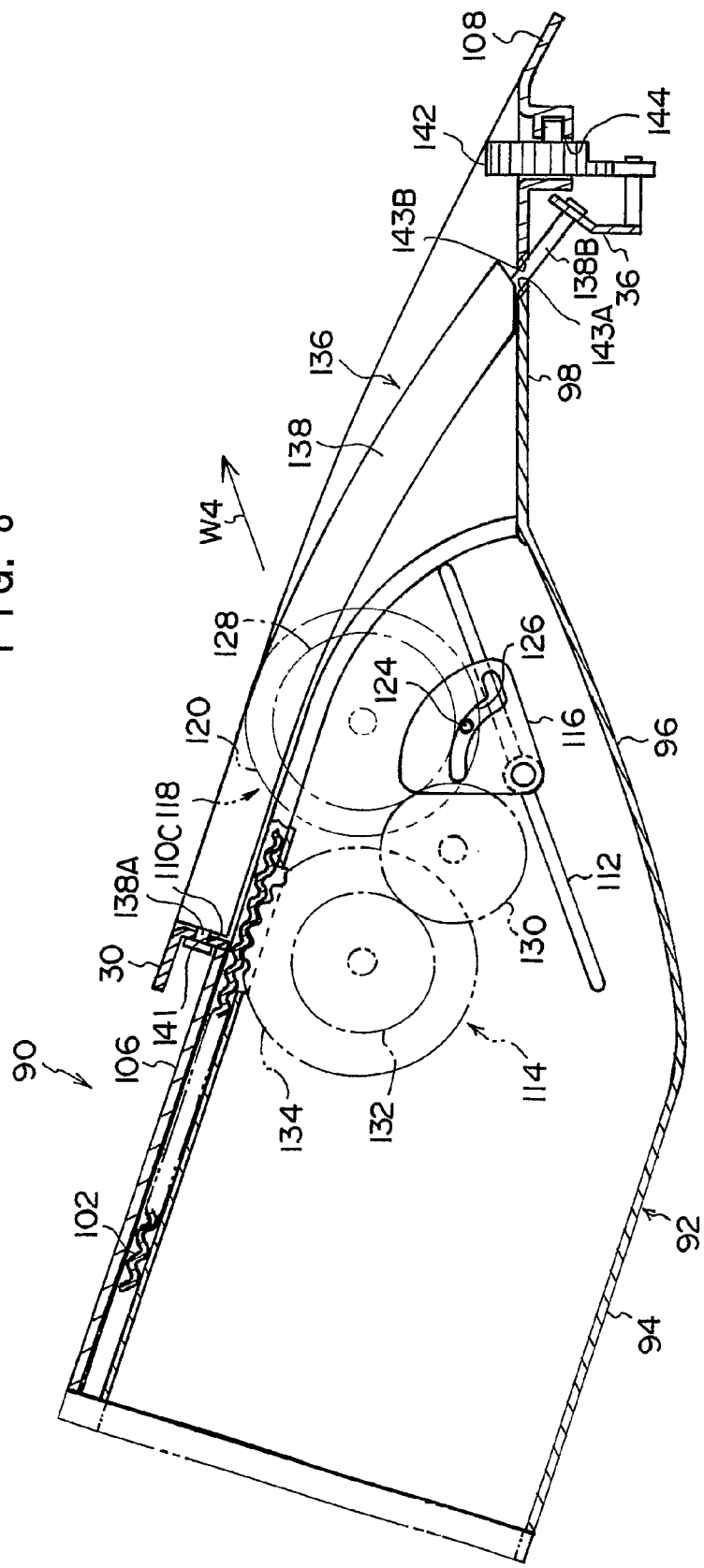
FIG. 8 is a cross-sectional view corresponding to FIG. 7 and showing a state in which a passage position changing part and a deflecting part are operated.

From this state, when the operation dial 118 is operated and rotated in the other direction around its axis, interlockingly therewith, the cam plate 116 rotates and the damper 112 rotates. The top surface of the damper 112 is inclined substantially toward the vehicle upper side. Therefore, in this state, as shown in FIG. 8, the air-direction of the air-conditioned air changes to the direction of arrow W4 which is inclined downward more than arrow W3 in FIG. 7.

Figure 9:
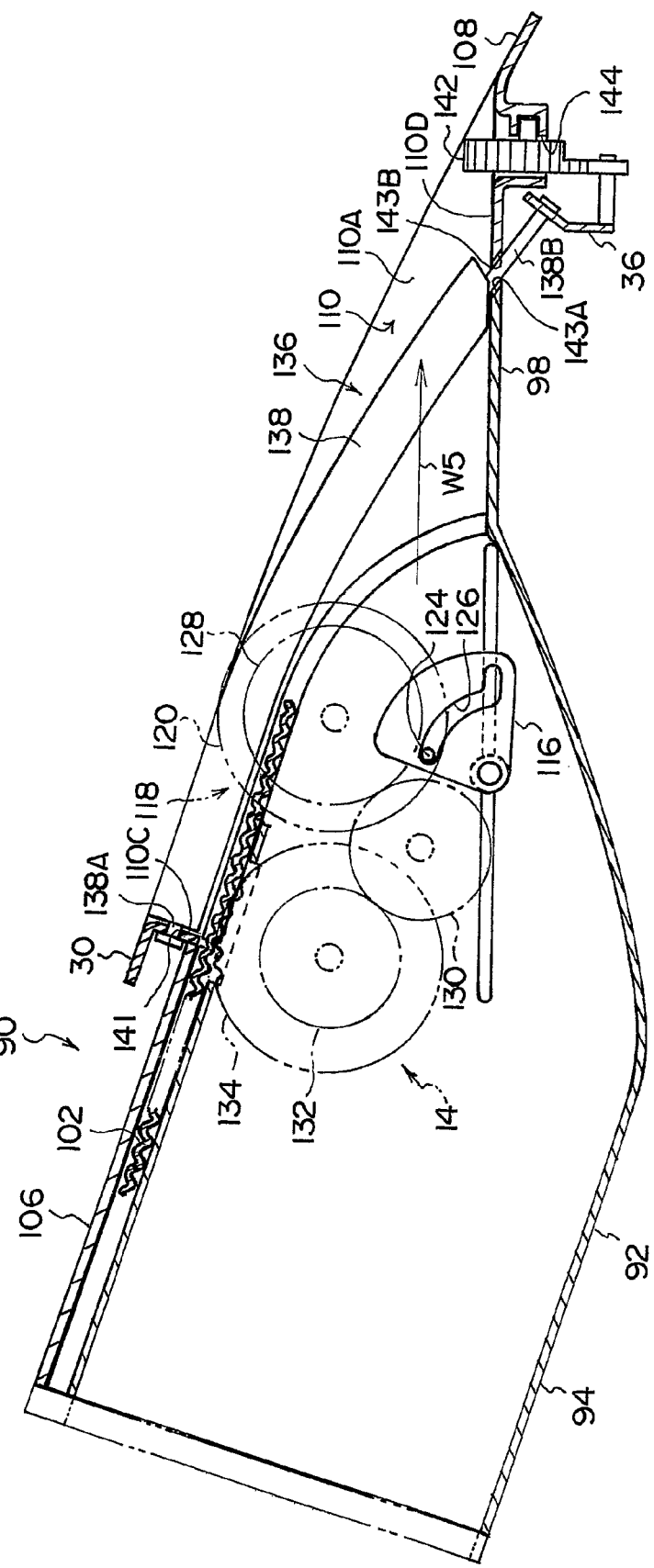
FIG. 9 is a cross-sectional view corresponding to FIG. 7 and showing a state in which the passage position changing part and the deflecting part are further operated.

When, from this state, the operation dial 118 is operated and rotated as greatly as possible in the other direction around the axis thereof, as shown in FIG. 9, the top surface of the damper 112 is inclined further upward, the longitudinal direction rear end portion of the damper 112 abuts the extended wall 98, and the flow path between the second floor wall 96 and the damper 112 is closed. Therefore, in this state, the air-direction of the air-conditioned air changes to the direction of arrow W5 which is inclined further toward the substantially vehicle lower side than arrow W4 in FIG. 8. In this way, the air-direction of the air-conditioned air is changed in the vertical direction at the air conditioning register 90.

Interlockingly with the rotation of the operation dial 118 in the one direction, the majority of or all of the shutter 102 is accommodated at the lower side of the top wall 106, and the longitudinal direction front side end portion of the damper 112 rotates so as to abut the second floor wall 96. Interlockingly with the rotation of the operation dial 118 in the other direction, the majority of or all of the shutter 102 is pulled-out from the top wall 106, and the longitudinal direction rear end portion of the damper 112 rotates so as to abut the extended wall 98.

In other word, the positional relationship between the damper 112 and the shutter 102, i.e., the interval between the longitudinal direction rear end portion of the damper 112 and the end portion of the shutter 102 at the substantially rear side of the vehicle, is maintained at a substantially constant size in the vehicle longitudinal direction. The interval, i.e., the range over which the air-conditioned air passes (the passage position) in the air conditioning register 90, moves relatively, but the effective opening surface area thereof does not change, or the rate of change in the effective opening surface area is extremely small. Therefore, even if the air-direction of the air-conditioned air is changed, a reduction in the blow-out range of the air-conditioned air, or the like, accompanying a reduction in the effective opening surface area does not arise, and the direction of the air-conditioned air can be changed efficiently.

Further, in the present exemplary embodiment, when the operation dial 142 is rotated and the left-right regulating fins 138 are rotated, the direction of the left-right regulating fins 138 in the substantially transverse direction of the vehicle changes, and the air-direction of the air-conditioned air can thereby be regulated. Here, as described above, in the present exemplary embodiment, the reinforcing members 140 are nipped-in at the inner sides of the left-right regulating fins 138. Therefore, as compared with a structure in which the left-right regulating fins 138 are merely formed of a synthetic resin material, the rigidity can be maintained even if the plate thickness is made to be thin.

Therefore, even if the longitudinal dimensions of the left-right regulating fins 138 are set to be long in order to correspond to the peripheral wall 110 whose opening dimension along the longitudinal direction of the left-right regulating fins 138 is relatively long, flexing and folding-over of the left-right regulating fins 138 can be prevented or can be prevented very efficiently.

Further, as described above, the left-right regulating fins 138 can be made to be thin by using the reinforcing members 140. Therefore, the decrease in the effective opening surface area, which accompanies the provision of the left-right regulating fins 138, can be suppressed, and a reduction of the blow-out range of the air-conditioned air, and the like, can be suppressed effectively.

Because the left-right regulating fins 138 are disposed so as to be positioned further toward the peripheral wall 110 side than the flange portion 30, a deterioration in the external appearance due to the left-right regulating fins 138 projecting-out toward the vehicle cabin interior side is not caused.

The air-conditioned air, which is blown-out from the blow-out bezel 108 so as to flow above the extended wall 98 and the rear wall portion 110D of the peripheral wall 110, flows so as to be interfered with by the operation dial 142 above the extended wall 98. Therefore, the air-conditioned air moves away (be peeled away) from the extended wall 98 and the rear wall portion 110D because the operation dial 142 projects-out further than the surface (the design surface) of the flange portion 30. In this way, flowing of the air-conditioned air from the surface of the rear wall portion 110D over the surface of the flange portion 30 and along the surface of the instrument panel, i.e., so-called "sticking of the air-conditioned air", can be prevented or effectively suppressed, and the air-conditioned air can be effectively sent into the vehicle cabin.

Further, by making the projecting portion, which interferes with the air-conditioned air, be the operation dial 142 as described above, there is no need to especially provide a projecting portion for interfering with the air-conditioned air at the flange portion 30 or the like. In this way, a deterioration in the external appearance of the flange portion 30 due to the provision of a separate projecting portion can be prevented.

Third Exemplary Embodiment

A modified example of the second exemplary embodiment will be described next as a third exemplary embodiment.

The structure of main portions of an air conditioning register 147 relating to the present exemplary embodiment is shown in a perspective view in FIG. 11. The structure of the main portions of the air conditioning register 147 is shown in a cross-sectional view in FIG. 12. Note that the main portions of the air conditioning register 147 shown in FIG. 11 and FIG. 12 are portions of the extended wall 98 and the rear wall portion 110D of the peripheral wall 110 of the air conditioning register 90 of the above-described second exemplary embodiment. At regions other than the regions where the structures differ from the air conditioning register 90, the structures are the same as the air conditioning register 90.

As shown in FIG. 7, at the air conditioning register 90 relating to the above-described second exemplary embodiment, the outer diameters of the shaft portions 138B of the left-right regulating fins 138, which pass through the hole portions structured by the cut-out portions 143A and the cut-out portions 143B are smaller than the widths of the left-right regulating fins 138.

In contrast, as shown in FIG. 11 and FIG. 12, in the air conditioning register 147 relating to the present exemplary embodiment, the shaft portions 138B of the left-right regulating fins 138 are not provided, and instead, shaft portions 148 are provided. The outer diameters of the shaft portions 148 are set to be greater than or equal to the widths of the left-right regulating fins 138. The inner diameters of the hole portions structured by the above-described cut-out portions 143A, 143B as well are set to sizes such that the shaft portions 148 can pass therethrough.

Further, as shown in FIG. 7, in the above-described second exemplary embodiment, the axial directions of the shaft portions 138B of the left-right regulating fins 138 are not orthogonal to the surfaces of the extended wall 98 and the rear wall portion 110D. Therefore, in the second exemplary embodiment, portions of the left-right regulating fins 138 at the extended wall 98 and rear wall portion 110D side are cut substantially parallel to the surfaces of the extended wall 98 and the rear wall portion 110D. By cutting portions of the left-right regulating fins 138 in this way in the second exemplary embodiment, the extended wall 98 is prevented from needlessly interfering with the left-right regulating fins 138, and the left-right regulating fins 138 can rotate smoothly.

However, in such a structure, when the left-right regulating fins 138 are rotated, gaps are formed between, on the one hand, the extended wall 98 or the rear wall portion 110D, and on the other hand, the portions where the left-right regulating fins 138 are cut. At the portions where such gaps are formed, either the direction of the air-conditioned air cannot be adjusted by the left-right regulating fins 138, or adjustment of the direction is difficult due to the air-conditioned air passing through vicinities of the gaps.

In contrast, in the air conditioning register 147 relating to the present exemplary embodiment, the outer diameter of the shaft portion 148 is set to be greater than or equal to the width (dimension D in FIG. 12) of the left-right regulating fin 138. More specifically, the outer diameter of the shaft portion 148 is set to be greater than or equal to the distance between the rotational center of the left-right regulating fin 138 and, among the both transverse direction end portions of the left-right regulating fin 138, the end portion which is further away from the rotational center of the left-right regulating fin 138 along the rotation radial direction of the left-right regulating fin 138. Therefore, the shaft portion 148 is positioned at the portion which becomes the gap at the time when the left-right regulating fin 138 is rotated in the above-described second exemplary embodiment. In this way, the direction of the air-conditioned air can be adjusted smoothly without gaps such as described above arising due to the left-right regulating fins 138 being rotated.

Further, because the outer diameters of the shaft portions 148 are set to be greater than or equal to the widths of the left-right regulating fins 138, the left-right regulating fins 138 can enter into the hole portions which are structured by the cut-out portions 143A, 143B since through which the shaft portions 148 can pass. Accordingly, even if the end portions of the left-right regulating fins 138 at the shaft portion 148 sides were to be extended in order for the aforementioned gaps to not be formed at the rotational positions of the left-right regulating fins 138 at which the gaps become the largest, when the left-right regulating fins 138 are rotated from the aforementioned rotational positions, the shaft portion 148 side end portions of the left-right regulating fins 138 enter into the hole portions structured by the cut-out portions 143A, 143B, and the left-right regulating fins 138 can rotate smoothly without receiving interference needlessly from the extended wall 98 or the rear wall portion 110D.

In this way, in the present exemplary embodiment, even if the surfaces of the extended wall 98 and the rear wall portion 110D, which are the passage portions of the shaft portions 148, are not orthogonal to the axial direction of the shaft portions 148, gaps do not form between the left-right regulating fins 138 and the surfaces of the extended wall 98 and the rear wall portion 110D. Further, the left-right regulating fins 138 can be smoothly rotated and the direction of the air-conditioned air can be smoothly adjusted, without the surfaces of the extended wall 98 and the rear wall portion 110D needlessly interfering with the left-right regulating fins 138 which rotate.

Structure of Fourth Exemplary Embodiment

A fourth exemplary embodiment of the present invention will be described next.

Figure 13:
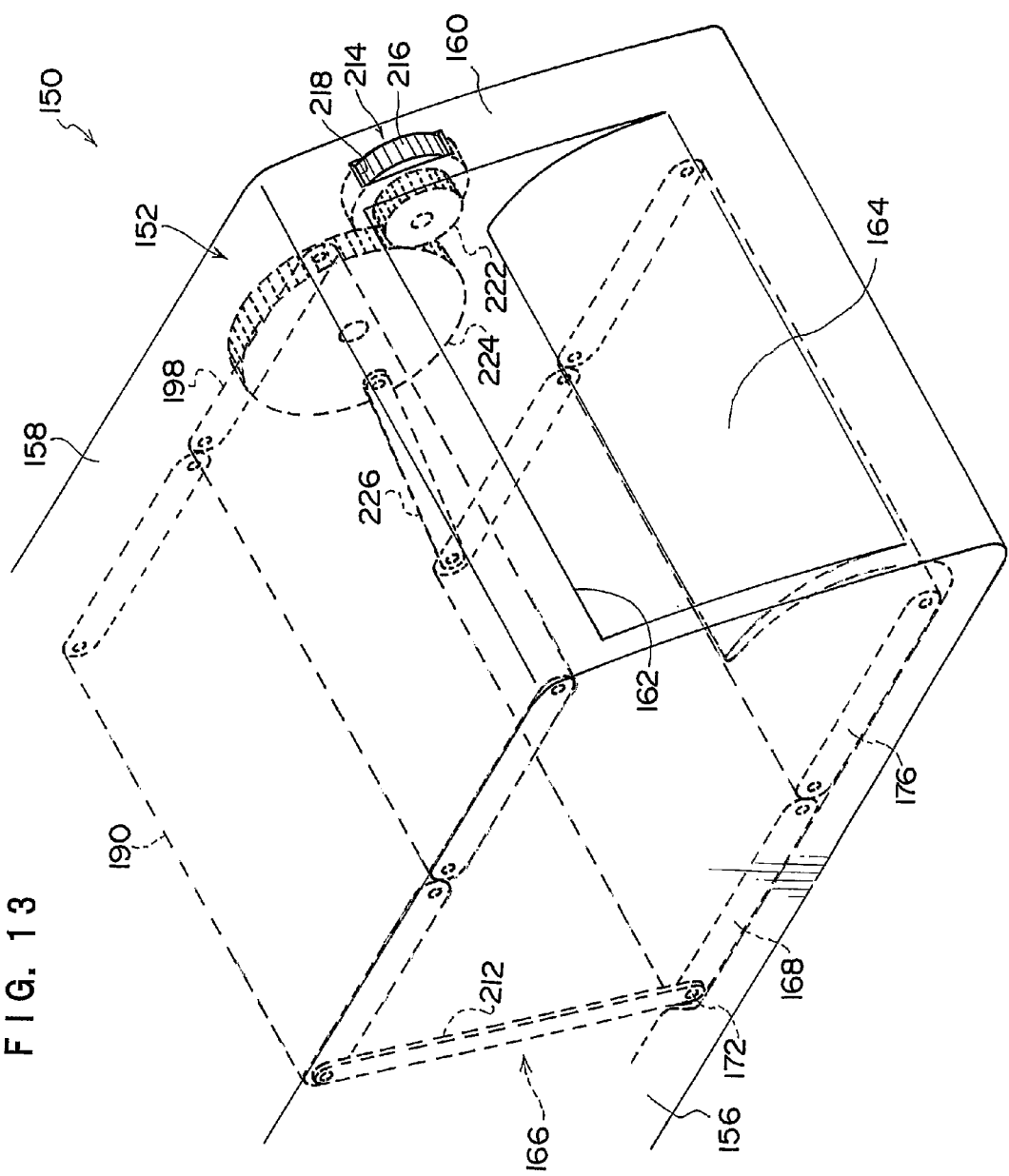
FIG. 13 is a perspective view of an air conditioning register relating to a fourth exemplary embodiment of the present invention.
Figure 15:
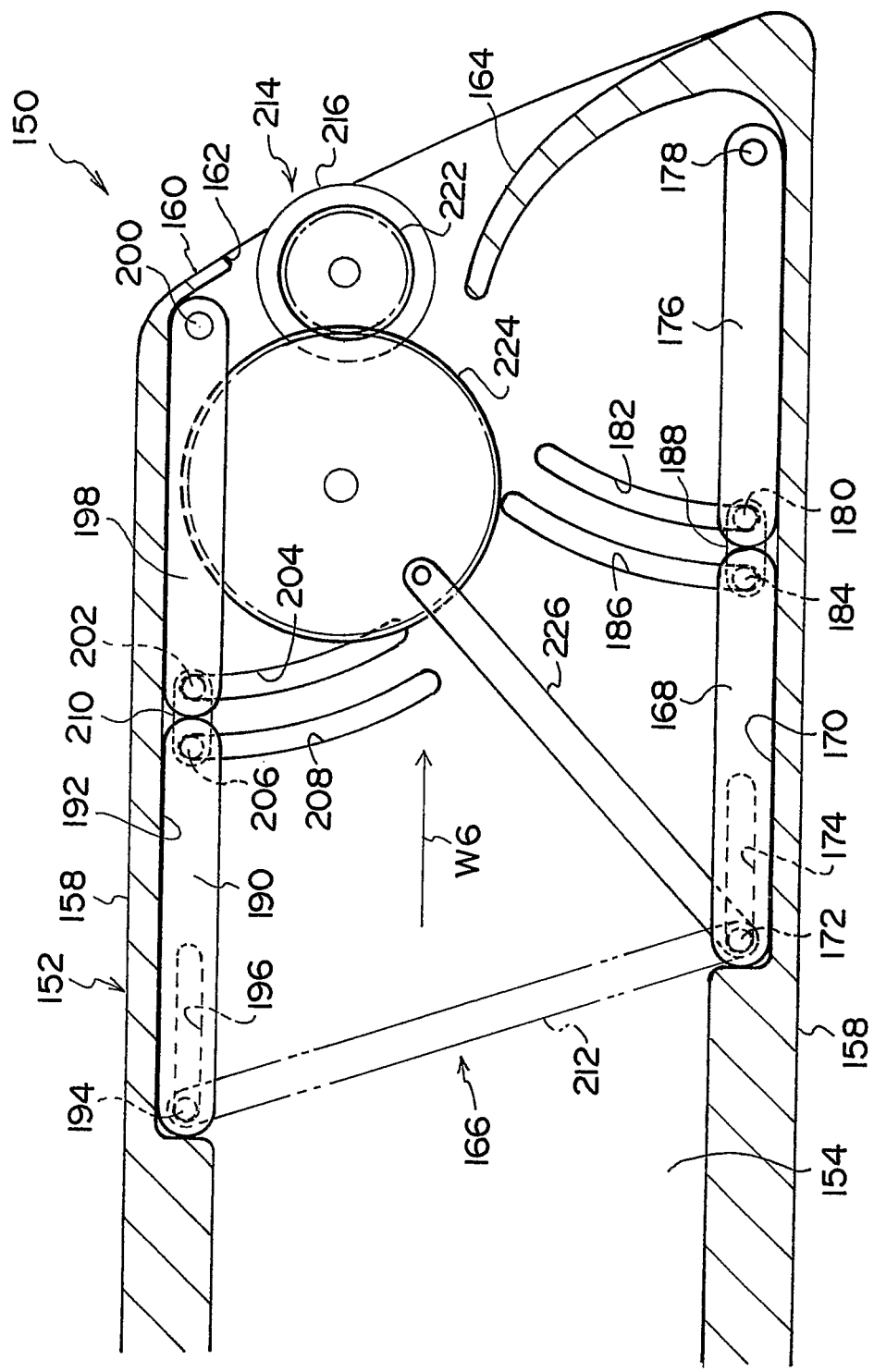
FIG. 15 is a cross-sectional view of the air conditioning register relating to the fourth exemplary embodiment of the present invention.

The exterior of an air conditioning register 150 relating to the present exemplary embodiment is shown in a perspective view in FIG. 13. As shown in FIG. 13, the air conditioning register 150 has a retainer 152 which serves as the register main body and which replaces the retainer 12 of the above-described first exemplary embodiment. As shown in FIG. 15, the retainer 152 has a flat-plate-shaped floor wall 154. Side walls 156 stand erect from the both ends of the floor wall 154 in the substantially transverse direction of the vehicle. Atop wall 158 is provided substantially parallel to the floor wall 154, at the top sides of the side walls 156. The retainer 152 is formed overall in the shape of a tube having a rectangular cross-section.

As shown in FIG. 13 and FIG. 15, at the rear end (the end portion at the vehicle cabin interior side) of this tube-shaped retainer 152, the floor wall 154 extends further outwardly in the passing-through direction of the retainer 152 than the top wall 158, and, in accordance therewith, the rear ends of the side walls 156 are inclined at a predetermined angle in the substantially longitudinal direction of the vehicle, so as to substantially rectilinearly connect the rear end of the floor wall 154 and the rear end of the top wall 158. A design wall 160, which corresponds to the blow-out bezel 26 in the above-described first exemplary embodiment, is formed at the rear end of the retainer 152. The surface (outer surface) of the design wall 160 is inclined in correspondence with one ends of the side walls 156.

An air blow-out port 162 which is substantially rectangular is formed in the design wall 160. The air-conditioned air, which has passed through the inner side of the retainer 152 from the front end side of the retainer 152, passes through the air blow-out port 162 and is blown-out toward the vehicle cabin interior. Further, a curved piece 164 extends from the bottom edge portion of the air blow-out port 162. The distal end side of the curved piece 164 is curved toward the inner side of the retainer 152. The curved piece 164 is provided in order to improve the design. Therefore, of the total opening surface area of the air blow-out port 162, the effective opening surface area is the opening surface area of the air blow-out port 162 between the distal end portion of the curved piece 164 and the top edge portion of the air blow-out port 162.

Figure 14:
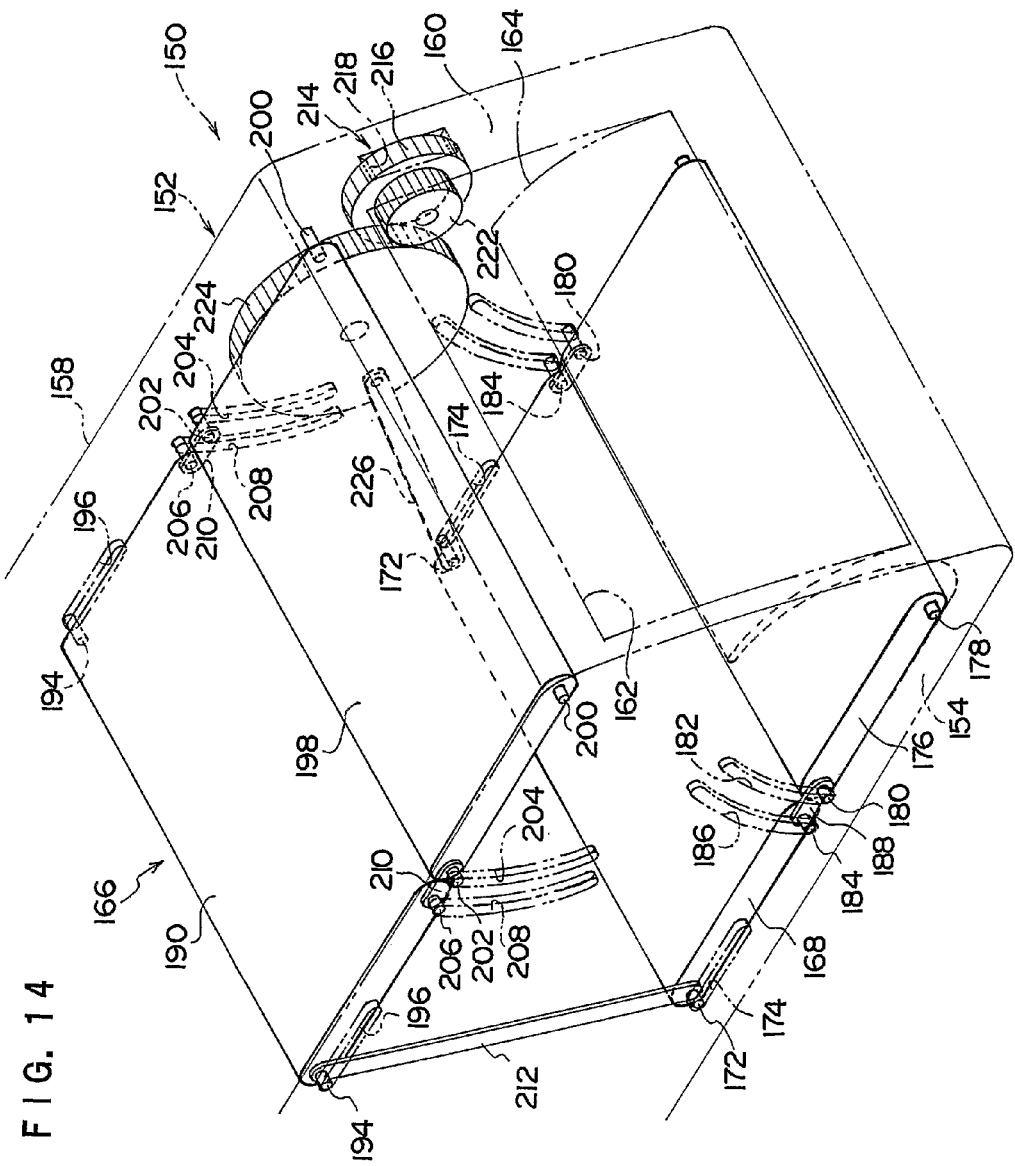
FIG. 14 is a perspective view showing the structure of an air-direction controlling unit of the air conditioning register relating to the fourth exemplary embodiment of the present invention.

An air-conditioned air guiding mechanism 166, which serves as a flow path shape deflecting part, is provided at the inner side of the retainer 152 having the above-described structure. As shown in FIG. 14 and FIG. 15, the air-conditioned air guiding mechanism 166 has a lower guide plate 168 which is shaped as a rectangular flat plate and serves as a first air-conditioned air guiding member. As shown in FIG. 15, the lower guide plate 168 is accommodated at the inner side of a lower accommodating portion 170 which is formed by making the floor wall 154 thin-walled by an amount approximately corresponding to the thickness of the lower guide plate 168, at the side between rear-end and the intermediate portion in the passing-through direction of the retainer 152. Further, solid-cylindrical shafts 172 are formed to project from the both transverse direction end portions of the lower guide plate 168 at the retainer 152 front end side. Lower guide grooves 174 are formed in the side walls 156 in correspondence with these shafts 172.

The lower guide grooves 174 are grooves which open at the inner peripheral side of the retainer 152, and the longitudinal directions thereof run along the passing-through direction of the retainer 152. The inner widths of the lower guide grooves 174 are only slightly larger than the outer diameters of the shafts 172. The shafts 172 are disposed within the lower guide grooves 174, and can rotate around their own axial centers and can move between the both longitudinal direction ends of the lower guide grooves 174. Further, a rotating plate 176 is accommodated in the lower accommodating portion 170, at the design wall 160 side of the lower guide plate 168. The rotating plate 176 is shaped as a flat plate in the same way as the lower guide plate 168.

Shafts 178 are formed to project from the both transverse direction end portions of the design wall 160 side of the rotating plate 176. Shaft-receiving holes (not shown), which open at the inner peripheral side of the retainer 152, are formed in the side walls 156 in correspondence with the shafts 178, and support the shafts 178 such that the shafts 178 rotate freely. Moreover, solid-cylindrical shafts 180 are formed to project from the transverse direction both end portions at the lower guide plate 168 side of the rotating plate 176. Lower arc-shaped grooves 182 are formed in the side walls 156 in correspondence with the shafts 180.

The lower arc-shaped grooves 182 open at the inner peripheral side of the retainer 152, and are curved such that the shaft-receiving holes at which the shafts 178 are pivotally-supported are the centers of curvature thereof. The inner widths of the lower arc-shaped grooves 182 are only slightly larger than the outer diameters of the shafts 180. The shafts 180 are disposed within the lower arc-shaped grooves 182, and can rotate around their own axial centers and can move between the both longitudinal direction ends of the lower arc-shaped grooves 182.

On the other hand, solid-cylindrical shafts 184 are formed to project from the transverse direction both end portions at the rotating plate 176 side of the lower guide plate 168. Lower arc-shaped grooves 186 are formed in the side walls 156 in correspondence with the shafts 184. The lower arc-shaped grooves 186 are grooves which open at the inner peripheral side of the retainer 152, and are curved such that the shaft-receiving holes at which the shafts 178 are pivotally-supported are the centers of curvature thereof. The inner widths of the lower arc-shaped grooves 186 are only slightly larger than the outer diameters of the shafts 184. The shafts 184 are disposed within the lower arc-shaped grooves 186, and can rotate around their own axial centers and can move between the both longitudinal direction ends of the lower arc-shaped grooves 186. Further, the aforementioned shafts 180 and the shafts 184 are connected by connecting pieces 188 so as to rotate freely around their own axes.

The air-conditioned air guiding mechanism 166 has a sliding/rotating plate 190 which is shaped as a rectangular flat plate. The sliding/rotating plate 190 is accommodated at the inner side of an upper accommodating portion 192 which is formed at from the front end side to the intermediate portion in the passing-through direction of the retainer 152 by making the top wall 158 be thin-walled by an amount approximately corresponding to the thickness of the sliding/rotating plate 190 and. Further, solid-cylindrical shafts 194 are formed to project from the both transverse direction end portions of the sliding/rotating plate 190 at the front end side in the passing-through direction of the retainer 152. Upper guide grooves 196 are formed in the side walls 156 in correspondence with the shafts 194.

The upper guide grooves 196 open at the inner peripheral side of the retainer 152, and the longitudinal directions thereof run along the passing-through direction of the retainer 152. The inner widths of the upper guide grooves 196 are only slightly larger than the outer diameters of the shafts 194. The shafts 194 are disposed within the upper guide grooves 196, and can rotate around their own axial centers, and can move between the longitudinal direction both ends of the upper guide grooves 196.

An upper guide plate 198, which serves as a second air-conditioned air guiding member, is accommodated in the upper accommodating portion 192, at the design wall 160 side of the sliding/rotating plate 190. The upper guide plate 198 is shaped as a flat plate in the same way as the sliding/rotating plate 190. Further, shafts 200 are formed to project from the both transverse direction end portions at the design wall 160 side of the upper guide plate 198. Shaft-receiving holes (not illustrated), which open at the inner peripheral side of the retainer 152, are formed in the side walls 156 in correspondence with the shafts 200, and support the shafts 200 such that the shafts 200 rotate freely.

Solid-cylindrical shafts 202 are formed to project from the both transverse direction end portions at the sliding/rotating plate 190 side of the upper guide plate 198. Upper arc-shaped grooves 204 are formed in the side walls 156 in correspondence with the shafts 202. The upper arc-shaped grooves 204 open at the inner peripheral side of the retainer 152 and are curved such that the shaft-receiving holes at which the shafts 200 are pivotally-supported are the centers of curvature thereof. The inner widths of the upper arc-shaped grooves 204 are only slightly larger than the outer diameters of the shafts 202. The shafts 202 are disposed within the upper arc-shaped grooves 204, and can rotate around their own axial centers and can move between the both longitudinal direction ends of the upper arc-shaped grooves 204.

Solid-cylindrical shafts 206 are formed to project from the transverse direction both end portions at the upper guide plate 198 side of the sliding/rotating plate 190. Upper arc-shaped grooves 208 are formed in the side walls 156 in correspondence with the shafts 206. The upper arc-shaped grooves 208 open at the inner peripheral side of the retainer 152 and are curved such that the shaft-receiving holes at which the shafts 200 are pivotally-supported are the centers of curvature thereof. The inner widths of the upper arc-shaped grooves 208 are only slightly larger than the outer diameters of the shafts 206. The shafts 206 are disposed within the upper arc-shaped grooves 208, and can rotate around their own axial centers and can move between the both longitudinal direction ends of the upper arc-shaped grooves 208.

The shafts 202 and the shafts 206 are connected by connecting pieces 210 so as to rotate freely around their own axes. Further, one of the shafts 194 of the sliding/rotating plate 190 and one of the shafts 172 of the lower guide plate 168 are mechanically connected by a connecting piece 212 so as to rotate freely around their own axes. When the shafts 172 move along the lower guide grooves 174, interlockingly therewith, the shafts 194 move along the upper guide grooves 196.

The air-conditioned air guiding mechanism 166 has an operation dial 214. The operation dial 214 has a disc-shaped dial portion 216. The dial portion 216 is pivotally-supported at one of the side walls 156 at the inner side of the retainer 152, so as to rotate freely around an axis whose axial direction is the direction in which the side walls 156 oppose one another. A rectangular opening portion 218 is formed in the design wall 160 in correspondence with the dial portion 216. A portion of the dial portion 216 passes through the opening portion 218, and is exposed at the outer side of the retainer 152. In this way, the dial portion 216 can be operated and rotated from the vehicle cabin interior.

A gear 222 is provided coaxially and integrally with the dial portion 216 at the axial direction side of the dial portion 216. Further, a gear 224 is provided at the side of the operation dial 214. The gear 224 is pivotally-supported at one of the side walls 156 at the inner side of the retainer 152, so as to rotate freely around an axis whose axial direction is the direction in which the side walls 156 oppose one another, and meshes with the gear 222. At a position which is apart from the center of rotation of the gear 224 at an axial direction one end portion of the gear 224, one end of a connecting piece 226 is connected so as to rotate freely around an axis whose axial direction is the same direction as the axis of rotation of the gear 224. The other shaft 172 is connected to the other end of the connecting piece 226 so as to rotate freely.

Operation of Fourth Exemplary Embodiment

The operation of the present exemplary embodiment will be described next.

At the air conditioning register 150 relating to the present exemplary embodiment, in the state in which the lower guide plate 168 and the rotating plate 176 are accommodated in the lower accommodating portion 170 and the sliding/rotating plate 190 and the upper guide plate 198 are accommodated in the upper accommodating portion 192, the top side surfaces in the directions of thickness of the lower guide plate 168 and the rotating plate 176, which are facing the inner side of the retainer 152, are oriented in substantially the same direction as the inner surface of the floor wall 154, and the bottom side surfaces in the directions of thickness of the sliding/rotating plate 190 and the upper guide plate 198, which are facing the inner side of the retainer 152, are oriented in substantially the same direction as the inner surface of the top wall 158. Therefore, the air-conditioned air which is sent into the retainer 152 flows in the retainer 152 parallel (in the direction of arrow W6 in FIG. 15) to the passing-through direction of the retainer 152, and passes through the air blow-out port 162 and is blown-out into the vehicle cabin.

Figure 16:
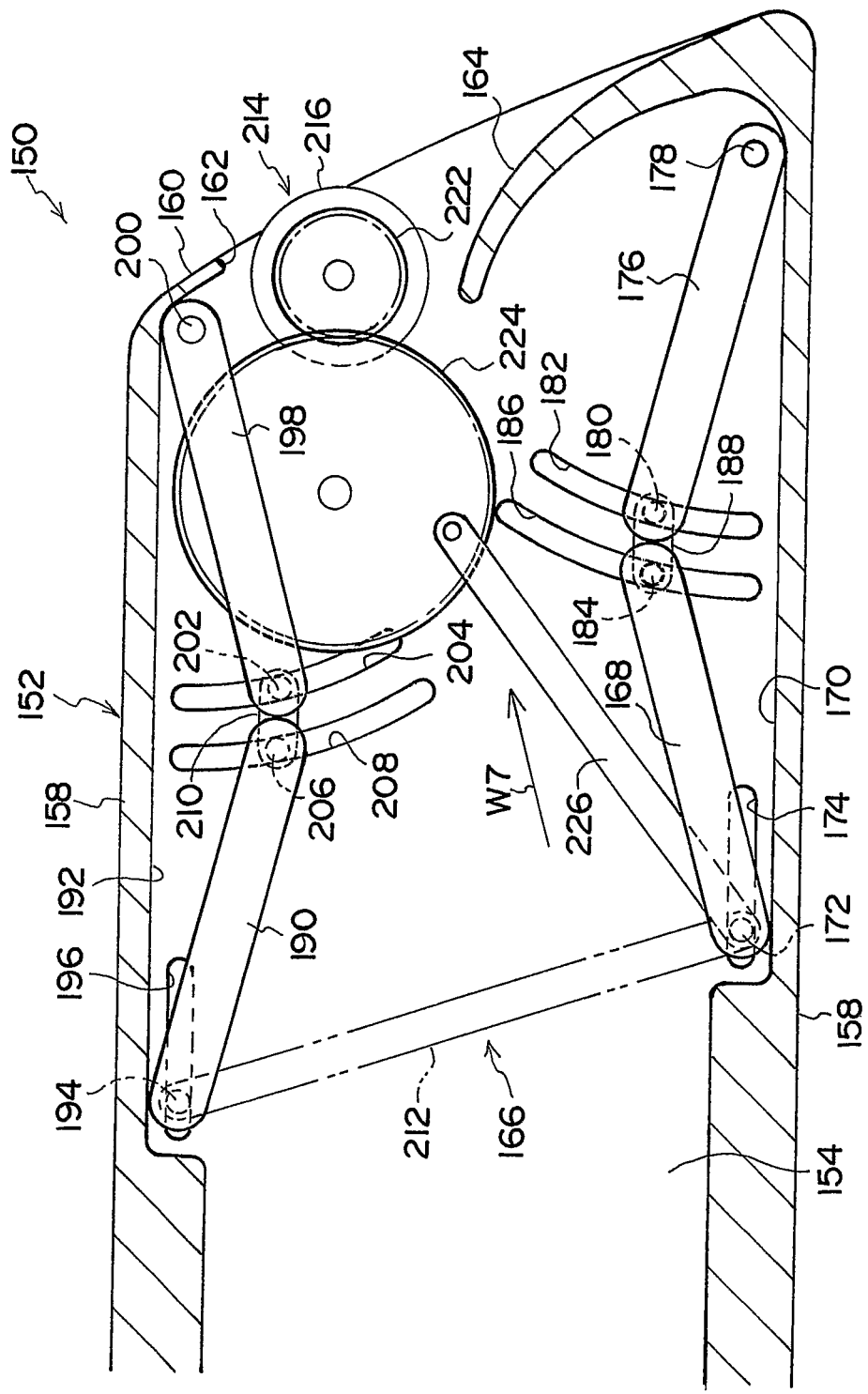
FIG. 16 is a cross-sectional view corresponding to FIG. 13 and showing a state in which a flow path shape is changed by a flow path shape changing part.

When, from this state, the dial portion 216 is rotated in one direction around the axis thereof, the gear 224 rotates, and one end of the connecting piece 226 thereby rotates toward the design wall 160. Due to the rotation of the connecting piece 226, the shafts 172 are slid along the lower guide grooves 174 toward the design wall 160. As shown in FIG. 16, when the intervals between the shafts 172 and the shafts 178 narrow due to the shafts 172 being slid toward the design wall 160, the lower guide plate 168 rotates around the shafts 172, and the shafts 184 rise-up along the lower arc-shaped grooves 186. Accompanying this, the shafts 180 rise-up along the lower arc-shaped grooves 182, and the rotating plate 176 rotates around the shafts 178.

When the shafts 172 slide, accompanying their sliding, the connecting piece 212 slides toward the design wall 160, and the shafts 194 thereby slide along the upper guide grooves 196 toward the design wall 160. When the intervals between the shafts 194 and the shafts 200 become narrow due to the shafts 194 being slid toward the design wall 160, the sliding/rotating plate 190 rotates around the shafts 194, and the shafts 206 are lowered along the upper arc-shaped grooves 208. Accompanying this, the shafts 202 are lowered along the upper arc-shaped grooves 204, and the upper guide plate 198 rotates around the shafts 200.

When the lower guide plate 168 and the upper guide plate 198 rotate in this way and the top surface in the thickness direction of the lower guide plate 168 and the bottom surface in the thickness direction of the upper guide plate 198 are inclined, the air-conditioned air, which passes through the interior of the retainer 152, passes through between the lower guide plate 168 and the upper guide plate 198. The air-direction is changed to a direction (the direction of arrow W7 in FIG. 16) which is inclined substantially upward with respect to the passing-through direction of the retainer 152, in accordance with the top surface in the thickness direction of the lower guide plate 168 and the bottom surface in the thickness direction of the upper guide plate 198, and the air-conditioned air passes through the design wall 160.

Figure 17:
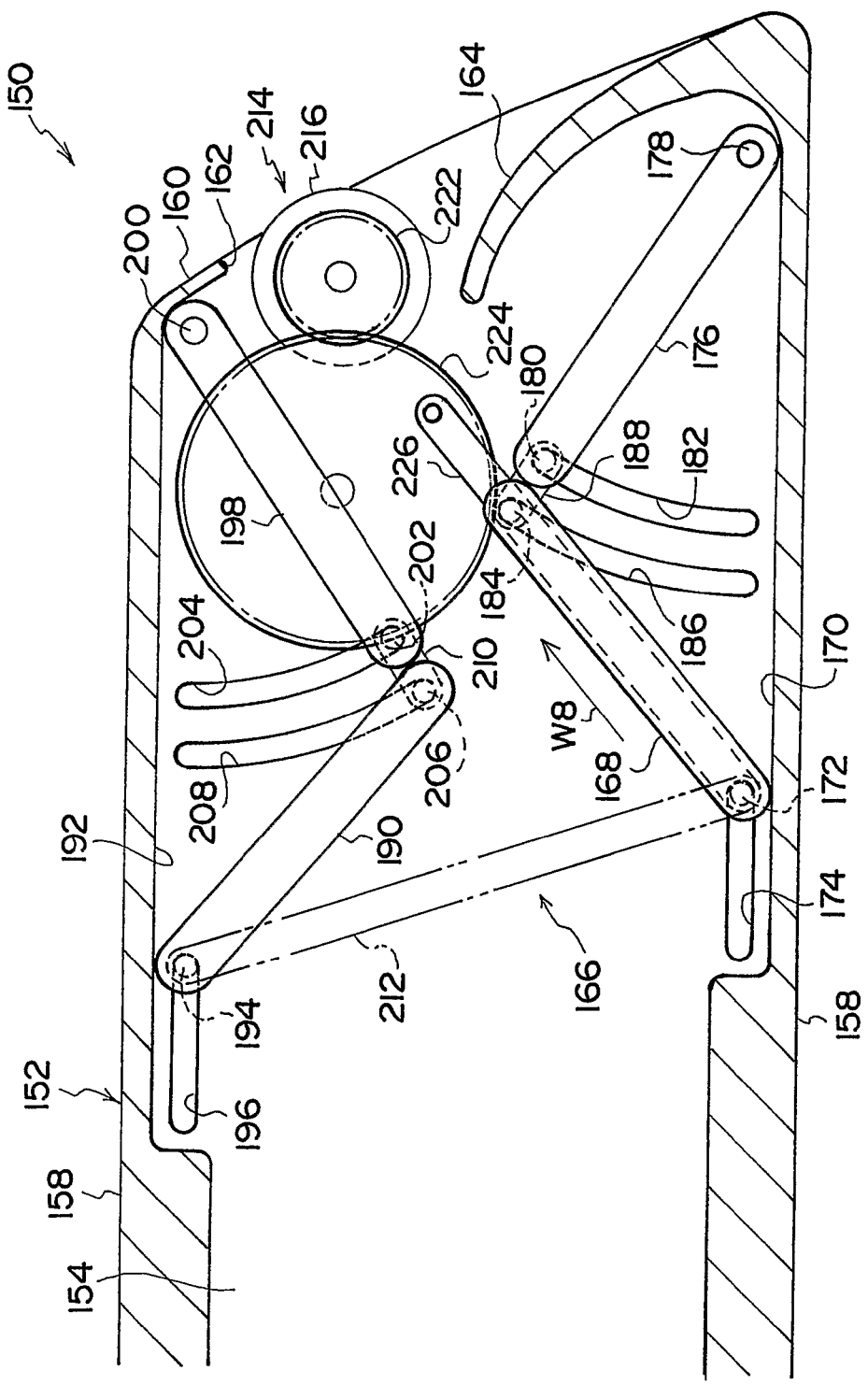
FIG. 17 is a cross-sectional view corresponding to FIG. 13 and showing a state in which the flow path shape is further changed by the flow path shape changing part.

When, from this state, the dial portion 216 is rotated further in the one direction around the axis thereof, as shown in FIG. 17, the top surface in the thickness direction of the lower guide plate 168 and the bottom surface in the thickness direction of the upper guide plate 198 are tilted further. In this way, when the air-conditioned air passes through between the lower guide plate 168 and the upper guide plate 198, the air-conditioned air is inclined further upward (i.e., is directed in the direction of arrow W8 in FIG. 17).

In this way, at the present air conditioning register 150, the region between the lower guide plate 168 and the upper guide plate 198 becomes the flow path of the air-conditioned air. By operating and rotating the dial portion 216 and tilting the lower guide plate 168 and the upper guide plate 198, the shape of the flow path of the air-conditioned air is changed, and the air-direction can thereby be tilted upward or downward. However, even if the air-direction of the air-conditioned air is regulated as described above, the effective opening surface area at the time when the air-conditioned air passes through the air blow-out port 162 of the design wall 160 is maintained at the opening surface area which corresponds to the opening width between the top edge portion of the air blow-out port 162 and the distal end portion of the curved piece 164. Therefore, no reduction in the blow-out range of the air-conditioned air, or the like, accompanying a decrease in the effective opening surface area is caused, and the direction of the air-conditioned air can be changed efficiently.

Note that, in the exemplary embodiments, explanation is given on the premise that the air conditioning register 10, 90, 150 is mounted to the instrument panel at the front side of the driver's seat or front passenger's seat of a vehicle. However, the position where the air conditioning register relating to the present invention is mounted is not limited in any way. Accordingly, the directions and the like of the respective members structuring the air conditioning registers 10, 90, 150 which have been described herein are to be changed appropriately in accordance with the mounted position of the air conditioning register.

The invention claimed is:

1. An air conditioning register comprising:
a register main body having an air blow-out port which opens toward a vehicle cabin interior, the register main body passing air-conditioned air which has been sent from an air conditioner main body and blowing the air-conditioned air out from the air blow-out port toward the vehicle cabin interior; and
an air-direction controlling unit that adjusts a direction of a flow of the air-conditioned air and controls a blow-out direction of the air-conditioned air from the air blow-out port, wherein
an operation part is provided at a side wall of the register main body,
the air-direction controlling unit comprises a flow path shape changing part,
the flow path shape changing part comprises a first air-conditioned air guiding member and a second air-conditioned air guiding member, the first air-conditioned air guiding member being provided at a lower end of the register main body with respect to a side view of the register main body, and the second air-conditioned air guiding member being fully enclosed inside of the register main body, and wherein the first air-conditioned air guiding member is formed by two plate members connected together at corresponding lengthwise ends of the two plate members such that orientations of the two plate members can be different from one another,
a proximal end side of the first air-conditioned air guiding member is provided at one inner wall of mutually opposing inner walls of the register main body, and, due to the first air-conditioned air guiding member rotating around the proximal end side thereof according to operation of the operation part, a distal end side of the first air-conditioned air guiding member approaches and moves away from the one inner wall and an angle of inclination of the first air-conditioned air guiding member with respect to a wall surface of the one inner wall changes, and
a proximal end side of the second air-conditioned air guiding member is provided at the other inner wall of mutually opposing inner walls of the register main body, and the second air-conditioned air guiding member rotates around the proximal end side thereof interlockingly with rotation of the first air-conditioned air guiding member, and, due to the rotation of the second air-conditioned air guiding member, a distal end side of the second air-conditioned air guiding member approaches and moves away from the other inner wall and an angle of inclination of the second air-conditioned air guiding member with respect to a wall surface of the other inner wall changes in accordance with the angle of inclination of the first air-conditioned air guiding member,
a plurality of air-conditioned air flow paths are formed at the register main body, the plurality of air-conditioned air flow paths intersect at a position that is located at a downstream side from the plurality of air-conditioned air flow paths and an upstream side from the air blow-out port, and
the effective opening surface area, through which the air-conditioned air flow passes, is not reduced.

2. The air conditioning register of claim 1, wherein the first air-conditioned air guiding member and the second air-conditioned air guiding member have shapes that are non-symmetrical to each other with respect to a side view of the register main body.

3. The air conditioning register of claim 1, wherein the first air-conditioned air guiding member and the second air-conditioned air guiding member are connected by a connecting piece such that the first air-conditioned air guiding member and the second air-conditioned air guiding member can rotate about respective axes with the connecting piece as a rotation center.

* * * * *